(12) United States Patent
Ikeda et al.

(10) Patent No.: US 6,744,583 B2
(45) Date of Patent: Jun. 1, 2004

(54) METHOD FOR FORMING A MAGNETIC PATTERN IN A MAGNETIC RECORDING MEDIUM, A MAGNETIC PATTERN FORMING DEVICE, A MAGNETIC RECORDING MEDIUM AND A MAGNETIC RECORDING DEVICE

(75) Inventors: Hiroyuki Ikeda, Yokohama (JP); Yuzo Seo, Yokohama (JP); Youji Arita, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 7 days.

(21) Appl. No.: 10/212,688

(22) Filed: Aug. 7, 2002

(65) Prior Publication Data
US 2003/0035235 A1 Feb. 20, 2003

(30) Foreign Application Priority Data

| Aug. 7, 2001 | (JP) | ................................... 2001-238698 |
| Oct. 24, 2001 | (JP) | ................................... 2001-326407 |
| Nov. 9, 2001 | (JP) | ................................... 2001-344618 |
| Apr. 1, 2002 | (JP) | ................................... 2002-099124 |

(51) Int. Cl.$^7$ ................................................. G11B 5/02
(52) U.S. Cl. ........................... 360/59; 360/17; 360/16; 360/66
(58) Field of Search ..................... 360/66, 59, 17, 360/1, 235.5; 369/13.42

(56) References Cited

U.S. PATENT DOCUMENTS

| 3,982,275 A | * | 9/1976 | Antonets et al. ............... 360/1 |
| 5,121,258 A | * | 6/1992 | Chi et al. ..................... 360/17 |
| 5,398,219 A | * | 3/1995 | Itoh et al. ................. 369/13.42 |
| 6,181,492 B1 | * | 1/2001 | Bonyhard ..................... 360/17 |
| 6,377,414 B1 | * | 4/2002 | Wang .......................... 360/59 |
| 6,522,134 B1 | * | 2/2003 | Gill ............................. 360/66 |
| 2002/0135941 A1 | * | 9/2002 | Kohira et al. ............. 360/235.5 |

OTHER PUBLICATIONS

L. Wang, et al., Journal of Applied Physics, vol. 91, No. 10, pp. 8685–8687, "Photo Thermal Patterning on Magnetic Media", May 15, 2002.

* cited by examiner

Primary Examiner—David Hudspeth
Assistant Examiner—Rocio Colon
(74) Attorney, Agent, or Firm—Oblon, Spivak, McClelland, Maier & Neustadt, P.C.

(57) ABSTRACT

A method for forming a magnetic pattern by applying a first external magnetic field to a magnetic recording medium having a magnetic layer to magnetize uniformly the magnetic layer in a predetermined direction and heating locally the magnetic layer while a second external magnetic field is applied thereto, whereby the heated portion is magnetized in the direction opposite to the predetermined direction, wherein the second external magnetic field has a pulse-like magnetic field component.

The method can form a fine magnetic pattern efficiently in a medium for high density recording, and a magnetic recording medium and a magnetic recording device capable of recording with high density can be provided economically in a short time.

39 Claims, 8 Drawing Sheets

A: HEATING TIME
B: APPLICATION TIME OF SECOND MAGNETIC FIELD
C: DEMAGNETIZED MAGNETIC FIELD, MAGNETIZED MAGNETIC FIELD
   IN OPPOSITE DIRECTION
D: ROOM TEMPERATURE CHARACTERISTIC
E: HEATING TEMPERATURE CHARACTERISTICS

METHOD FOR FORMING A MAGNETIC PATTERN IN A MAGNETIC RECORDING MEDIUM, A MAGNETIC PATTERN FORMING DEVICE, A MAGNETIC RECORDING MEDIUM AND A MAGNETIC RECORDING DEVICE

BACKGROUND OF THE INVENTION

1. Field of the Invention

The present invention relates to a method for forming a magnetic pattern in a magnetic recording medium used for a magnetic recording device, method for producing a magnetic recording medium, a magnetic recording medium and a magnetic recording device.

2. Discussion of Background

A magnetic recording device represented by a magnetic disk device (a hard disk drive) has widely been used as an external memory device for an information processing device such as a computer, and has recently been used as a recording device for recording dynamic images or a set-top box.

Generally, the magnetic disk device houses a single or plurality of magnetic disks and a recording/reproducing head. As the recording/reproducing head, a flying head is generally used wherein it moves above the magnetic disk at a constant flying height. Other than the flying head, the use of a contact head is proposed in order to make the distance to the medium closer.

The magnetic recording medium such as the magnetic disk is generally prepared by forming a NiP layer, a metal underlayer, a magnetic layer (a recording layer), a protective layer, a lubricant layer and so on on the surface of a substrate of aluminum alloy successively. Or, it is prepared by forming a metal underlayer, a magnetic layer (a recording layer), a protective layer, a lubricant and so on on the surface of a substrate such as glass successively. The magnetic recording medium includes a longitudinal magnetic recording medium and a perpendicular magnetic recording medium. In the longitudinal magnetic recording medium, longitudinal recording is generally carried out.

The tendency of making the magnetic disk more dense has been accelerated year by year, and various techniques for increasing the density have been proposed. For example, there is an attempt to increase the number of tracks by narrowing the space of information recording tracks. For example, a density of track of 100 ktpi or more is needed in order to realize 100 Gbit/inch$^2$.

In each track, a controlling pattern for controlling synchronization and the position of the recording/reproducing magnetic head is formed. When the space of tracks is narrowed, it is necessary to make the magnetic pattern (hereinbelow, referred to as "the servo pattern") used for controlling the position of the magnetic head dense in a radial direction of the disk, i.e., to form the magnetic pattern in more number, so as to conduct precise controlling.

Further, there is an increased demand to widen a data recording area to increase the data recording capacity by reducing the area other than that for recording data, namely, an area used for the servo pattern and gap portions between the servo areas and the data recording areas. For this purpose, it is necessary to increase an output of the servo pattern or to increase the accuracy of synchronization.

In the conventional technique, there has been widely used a method wherein an opening is formed in the vicinity of the head actuator of the drive (the magnetic recording device), a pin with an encoder is inserted into the opening to engage the actuator with the pin whereby the head is driven to a correct position to record the servo pattern. However, such method encountered difficulty in recording correctly the servo pattern because the position of the gravity center of the actuator was different from the position of the gravity center of a positioning mechanism, so that highly accurate track position control could not be obtained.

On the other hand, there is a proposed technique that laser beams are irradiated to a magnetic disk to deform locally the surface of the disk whereby projections and recesses are physically formed so that servo patterns of projections and recesses are produced. However, this technique had problems that the formed projections and recesses made the flying head unstable to affect adversely recording or reproducing information; laser beams having a large power was necessary in order to form the projections and recesses, thus being costly, and it took much time to form the projections and recesses one by one.

In view of the above, some servo pattern forming methods are proposed.

As an example, there is a method that a servo pattern is formed in a master disk having a magnetic layer of high coercive force, the master disk is brought to close contact with the magnetic disk, and an auxiliary magnetic field is applied from the outside whereby a magnetic pattern is printed (U.S. Pat. No. 5,991,104).

As another example, there is a method that a magnetic disk is previously magnetized along a certain direction; a soft magnetic layer having a high permeability and low coercive force is formed by patterning on a master disk, and the master disk is brought to close contact with the magnetic disk, and then, an external magnetic field is applied. The soft magnetic layer serves as a shield, and a magnetic pattern is printed to an unshielded area (see U.S. Pat. No. 3,869,711, EP915456 and "Readback Properties of Novel Magnetic Contact Duplication Signals with High Recording Density FD" (Sugita, R et. al, Digest of InterMag 2000, GP-06, IEEE).

In this technique, a master disk is used, and a magnetic pattern is formed in the magnetic disk by applying a strong magnetic field.

The intensity of a magnetic field generally depends on distances. When a magnetic pattern is recorded by applying a magnetic field, the boundary of the pattern is apt to be unclear due to a stray magnetic field. Accordingly, it is essential to bring the master disk to contact with the magnetic disk in order to minimize the stray magnetic field. As the magnetic pattern is finer, it is necessary to bring them close contact without any gap. Usually, the both members are press-contacted by using vacuum suction.

Further, the higher the coercive force of the magnetic disk is, the larger the magnetic field used for printing is, and accordingly, the stray magnetic field becomes large. Therefore, the perfect close contact is required.

Accordingly, the above-mentioned technique is easily applicable to a magnetic disk of low coercive force or a flexible floppy (trademark) disk which is easy to contact. However, it is very difficult to apply this technique to a magnetic disk for high density recording which has a coercive force of 3,000 Oe or more. Namely, in the magnetic disk comprising a hard substrate, there was a possibility that fine dust deposited thereon at the time of contacting closely whereby a defect was resulted in the magnetic disk, or an expensive master disk was damaged. In a case of a glass substrate, in particular, there was a problem that the deposition of dust might cause insufficient close contact, so that it might be impossible to conduct magnetic printing, or a crack was resulted in the magnetic disk.

On the other hand, in the technique described in Japanese Patent Application Nos. 2000-134608 and 2000-134611, a magnetic pattern is formed in a magnetic recording medium in the combination of heating a local portion and applying an external magnetic field. For example, a medium is magnetized previously in a certain direction; pulse-like energy beams or the like are irradiated to the medium through a patterned mask to heat the medium locally; an external magnetic field is applied while the coercive force of the heated area is reduced so that recording is conducted to the heated area by using the external magnetic field. Thus, a magnetic pattern is formed.

According to this technique, the recording is performed with a relatively weak external magnetic field because the coercive force is reduced by heating. Further, since the area for recording is limited to the heated area, and there is no possibility of recording to the area other than the heated area even when the magnetic field is applied thereto, a clear magnetic pattern can be recorded without bringing the mask to close contact with the medium. Accordingly, there is little possibility that the medium or the mask is damaged by the close contact and causing an increased defect in the medium. Further, this technique makes it possible to form a good oblique magnetic pattern which was difficult to form.

According to this technique, various kinds of fine magnetic pattern can be formed efficiently with high accuracy without damaging the medium or the mask, or increasing a defect in the medium.

In the magnetic recording media used recently have such problems that individual magnetic domains are small because the medium is recorded with high density and unwilled reversal is apt to occur due to a change of a heat or magnetic field whereby stability in recording may decrease.

In order to prevent this, it is necessary to make the grain size of crystal in the recording layer small so that the medium has a high coercive force and a high S/N. However, when the grain size of crystal is made small, the dynamic coercive force is apt to be large.

Further, in order to increase the thermal stability of magnetic domains, there has recently been proposed an AFC (anti-ferromagnetic coupled) medium which is formed by laminating two or more magnetic layers (a principal magnetic layer and a magnetic underlayer) by interposing a Ru layer or the like having a thickness of several Angstroms wherein the thermal stability of the principal magnetic layer is increased by coupling magnetically between these magnetic layers between which the Ru layer is interposed. Since this medium has a large apparent coercive force, a large magnetic field is required in order to reverse magnetization.

A so-called coercive force means generally a coercive force measured based on a B-H loop (a hysteresis loop) obtained when a magnetic field is sweeped over a long time of several 10 sec, i.e., a static coercive force. On the other hand, a dynamic coercive force is a coercive force obtainable from sweeping a magnetic field for a very short time such as scanning by a magnetic head. Usually, it means a coercive force obtained when a magnetic field intensity is changed for a short time of 1 sec. or less.

Generally, the dynamic coercive force is larger than the static coercive force. The dynamic coercive force varies largely depending on a time width in which the magnetic field is changed, and it indicates a large value as the time width is shorter. For example, the dynamic coercive force obtained by applying a magnetic field for 100 msec. is generally larger than the dynamic coercive force obtained by applying the magnetic field for 1 sec.

As described above, since a high S/N is essential in order to provide high density, it is inavoidable that the dynamic coercive force of such magnetic recording medium for high density recording is large. For example, in a magnetic recording medium having a recording density of 30 to 40 Gbit/inch$^2$ level, the dynamic coercive force reaches twice or more as much as the static coercive force. For such medium, a magnetic head having a high writing ability is required even in a case of writing with the head.

When the magnetic layer of such medium is heated and magnetized with pulse-like energy beams for a very short time of several 10 nano sec in the above-mentioned magnetic pattern forming technique, the dynamic coercive force is involved dominantly. Namely, even when a magnetic field exceeding the static coercive force at the heating time is applied, the magnetic field intensity is insufficient, and a magnetic pattern having a sufficient output of signal may not be formed. Accordingly, it is necessary to apply an external magnetic field which can overcome the dynamic coercive force at the heating time to magnetize the magnetic layer.

In particular, in a case that an interference fringe of non-concentric circle generates in the medium by the reason that the distance between the mask and the medium is not constant or the like, there results a concentric circle area of strong light and a concentric circle area of weak light. In a dark area, the coercive force of the magnetic layer does not sufficiently decrease, and a large external magnetic field is needed for magnetization.

However, there is a way of applying a large external magnetic field with use of a permanent magnetic which generates usually magnetism. However, the permanent magnet may magnetize an area other than the heated area whereby a predetermined magnetic pattern is not obtainable; noises are generated in an area magnetized previously, or a magnetic pattern which has once been formed may be erased.

SUMMARY OF THE INVENTION

Therefore, the present invention is to provide a method for applying an effective external magnetic field to a magnetic recording medium having a high dynamic coercive force in the technique to form a magnetic pattern in the magnetic recording medium by combining the application of heat to a local portion and an external magnetic field.

It is another object of the present invention to provide a method for forming effectively a fine magnetic pattern in a magnetic recording medium for high density recording, an AFC medium or the like, a device for forming the magnetic pattern, a magnetic recording medium and a magnetic recording device capable of high density recording in a short time in an economical manner.

In accordance with a first aspect of the present invention, there is provided a method for forming a magnetic pattern by applying a first external magnetic field to a magnetic recording medium having a magnetic layer to magnetize uniformly the magnetic layer in a predetermined direction and heating locally the magnetic layer while a second external magnetic field is applied thereto, whereby the heated portion is magnetized in the direction opposite to the predetermined direction, wherein the second external magnetic field has a pulse-like magnetic field component.

According to a second aspect of the present invention, there is provided a magnetic recording medium in which a magnetic pattern is formed by the above-mentioned magnetic pattern forming method.

According to a third aspect of the present invention, there is provided a magnetic recording device characterized by comprising a magnetic recording medium in which a magnetic pattern is formed by the method for forming a magnetic pattern as described in the first aspect, a driving portion for driving the magnetic recording medium in a recording direction, a magnetic head having a recording portion and a reproducing portion, means for moving relatively the magnetic head with respect to the magnetic recording medium, and a recording/reproducing signal processing means which supplies a recording signal to the magnetic head and receives a reproducing signal from the magnetic head.

According to a fourth aspect of the present invention, there is provided a method for producing a magnetic recording medium having a magnetic layer, a protective layer and a lubricant layer formed on a substrate in this order wherein a magnetic pattern is formed in the magnetic layer, the method being characterized by comprising a step of forming the magnetic layer and the protective layer on the substrate, a step of forming the lubricant layer on the protective layer, and a step of applying a first external magnetic field to magnetize uniformly the magnetic layer in a predetermined direction, and heating locally the magnetic layer while applying a second external magnetic field having a pulse-like magnetic field component to magnetize the heated portion in the direction opposite to the predetermined direction whereby a magnetic pattern is formed.

According to a fifth aspect of the present invention, there is provided a magnetic recording medium prepared by the above-mentioned method.

According to a sixth aspect of the present invention, there is provided a magnetic recording device characterized by comprising a magnetic recording medium produced by the above-mentioned method, a driving portion for driving the magnetic recording medium in a recording direction, a magnetic head having a recording portion and a reproducing portion, means for moving relatively the magnetic head with respect to the magnetic recording medium, and a recording/reproducing signal processing means which supplies a recording signal to the magnetic head and receives a reproducing signal from the magnetic head.

According to a seventh aspect of the present invention, there is provided a magnetic pattern forming device for forming a magnetic pattern in a magnetic recording medium, the magnetic pattern forming device being characterized by comprising a medium holding means for holding the magnetic recording medium, an energy beam source for emitting energy beams, a projection means for projecting and irradiating the energy beams from the energy beam source to the magnetic recording medium, and a magnetic field generating means for applying a magnetic field to the magnetic recording medium, wherein the magnetic field generating means generates a magnetic field having a pulse-like magnetic field component.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

PREFERRED EMBODIMENT OF THE PRESENT INVENTION

Figure 1:
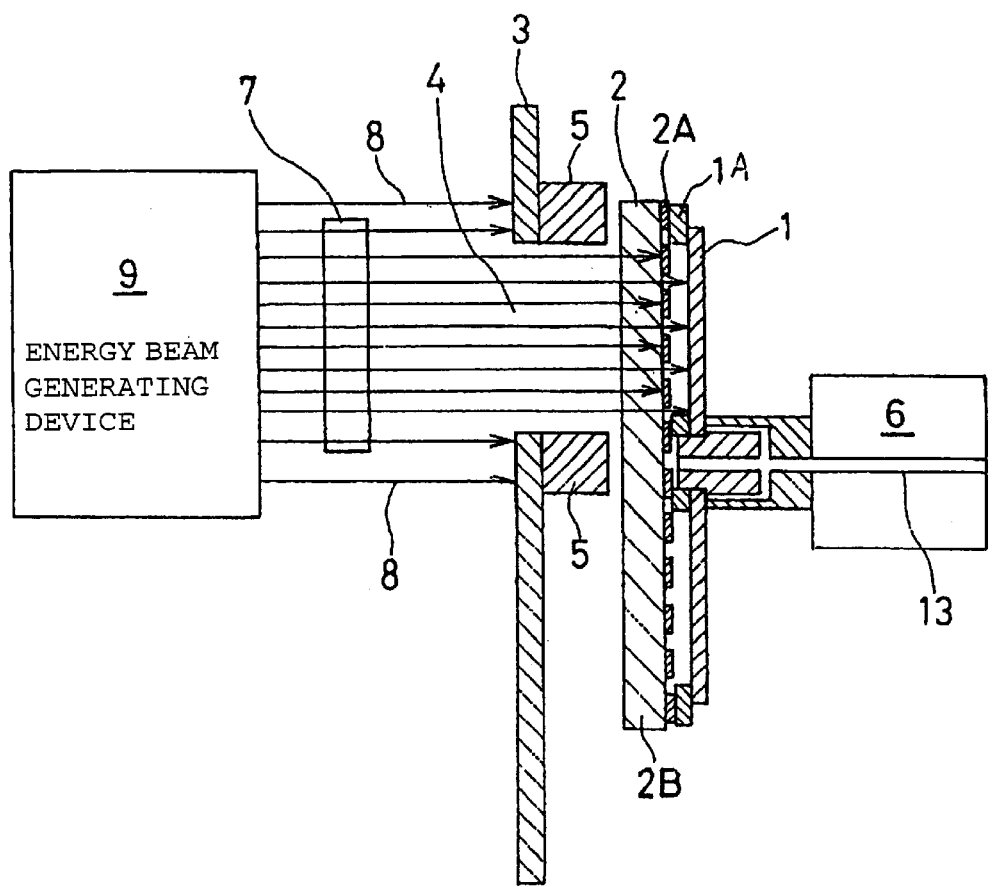
FIG. 1 is a diagrammatical view partly cross-sectioned showing an embodiment of the magnetic pattern forming device according to the present invention.

The present invention is characterized by applying a second external magnetic field having a pulse-like magnetic field component in the technique of forming a magnetic pattern by applying a first external magnetic field to a magnetic recording medium having a magnetic layer to magnetize uniformly the magnetic layer in a predetermined direction and heating locally the magnetic layer while a second external magnetic field is applied thereto, whereby the heated portion is magnetized in the direction opposite to the predetermined direction. Namely, a large magnetic field is applied dynamically in a very short time in the second external magnetic field, whereby a magnetic recording medium having a large dynamic coercive force can be applied with a magnetic field nearly equal to or larger than the static coercive force. The application of a large magnetic field does not affect adversely an area other than the heated area because the application time is very short. Accordingly, an external magnetic field which overcomes the dynamic coercive force in heating can be applied, and an excellent magnetic pattern can be formed.

The dynamic coercive force is fairly larger than the static coercive force. Accordingly, even when the dynamic coercive force is made smaller in a heated area, there is a case that the dynamic coercive force is still larger than the static coercive force in a non-heated area around the heated area. In this case, if the second external magnetic field which overcomes the dynamic coercive force is continuously (statically) applied, there is a possibility that the non-heated area is also magnetized.

On the other hand, according to the present invention, there is little possibility of affecting the non-heated area around the heated area even though a magnetic field larger than the static coercive force at room temperature is applied because the second external magnetic field having a pulse-like magnetic field component is applied. Further, the heated area can be magnetized well since a sufficiently large magnetic field is applied during the heating. There is little possibility that noises take place in a region which has previously been magnetized uniformly, or a magnetic pattern which have once been formed is erased.

Further, a fine magnetic pattern can effectively be formed even in a magnetic recording medium having a large dynamic coercive force usable for high density recording.

Further, according to the method of the present invention, a magnetic recording medium for high density recording in which a desired magnetic pattern is formed correctly; occurrence of noises is suppressed; reproducing signals of high output can be generated, and S/N and C/N are high, can be obtained.

According to the present invention, even when an interference fringe is resulted and a dark area is generated because of an insufficient reduction of the coercive force of the magnetic layer, an external magnetic field sufficient to overcome the coercive force can be applied. Accordingly, a magnetic pattern having a sufficient reproducing signal output can be formed in such area, and deterioration (increase) of the modulation as in the conventional technique can be suppressed.

In the conventional technique, if an interference fringe is generated in the magnetic recording medium, the coercive force of the magnetic layer is not fully reduced in a dark area whereby the formation of the magnetic pattern becomes insufficient. Therefore, there results an area having a high output of reproducing signal and an area having a low output of reproducing signal whereby the modulation tends to be deteriorated.

The modulation (Mod) is expressed by Mod=(AMPmax−AMPmin)/TAA×100 where TAA (total average amplitude) is an averaged output of reproducing signal in the same pattern area, and AMPmax and AMPmin are respectively the maximum value and the minimum value in that area. In this case, TAA, AMPmax and AMPmin are all values in peak-to-peak. The value of the modulation is preferably 30% or less, more preferably, 20% or less in consideration of servo tracking accuracy.

The present invention will be described in more detail.

First, a technique of the present invention wherein a magnetic pattern is formed in a magnetic recording medium by combining heating a local portion and the application of an external magnetic field will be described.

In the method for forming a magnetic pattern according to the present invention, a magnetic pattern is formed by applying a first external magnetic field to the magnetic layer to magnetize it uniformly in a predetermined direction; heating locally the magnetic layer, and at the same time, applying a second external magnetic field having a pulse-like magnetic field component to thereby magnetize the heated area in the direction opposite to the predetermined direction. According to this method, magnetic domains having magnetic directions opposite to each other can clearly be formed, and a magnetic pattern having a strong signal intensity and excellent C/N and S/N is obtainable.

The term "heating locally" or "heating a local portion" in the present invention means that the entirety of the magnetic layer of a magnetic recording medium is not heated but only a portion of the magnetic layer of the magnetic recording medium is heated.

First, the first external magnetic field of high intensity is applied to a magnetic recording medium to magnetize uniformly the entirety of the magnetic layer in a predetermined direction. As means for applying the first external magnetic field, a magnetic head may be used or an electromagnet or permanent magnet may be arranged so that a magnetic field is produced in a predetermined direction. Further, these means may be used in combination.

In a magnetic recording medium having the easy magnetization axis extending in its longitudinal direction, the predetermined magnetization direction is the same as or opposite to the direction of moving the data recording/reproducing head (the direction of relative movement of the medium and the magnetic head). In a magnetic recording medium having the easy magnetization axis extending in the direction perpendicular to the longitudinal direction, the predetermined magnetization direction may be either one (an upward direction or downward direction) in the perpendicular direction. Accordingly, the first external magnetic field should be applied according to the above-mentioned magnetization.

The uniform magnetization of the magnetic layer in its entirety in a predetermined direction means that the entirety of the magnetic layer is magnetized in substantially the same direction. In a strict sense, however, it is not always necessary to magnetize the entirety of the magnetic layer but only an area where a magnetic pattern is formed may be magnetized in the same direction.

The intensity of the first external magnetic field may be determined depending on the coercive force of a magnetic recording medium. It is preferable that the magnetic layer is magnetized by a magnetic field of at least two times as much as the static coercive force of the magnetic layer at room temperature. The application of a magnetic field weaker than that value may cause insufficient magnetization. Generally, the intensity of the magnetic field is at most about 5 times as much as the static coercive force of the magnetic layer at room temperature, which is limited by the ability of a magnetization device used for the magnetic field. The room temperature is 25° C. for example. The coercive force of the magnetic recording medium is substantially the same as the coercive force of the magnetic layer (recording layer).

With respect to heating a local portion, heating should be conducted to the extent that the static coercive force of the magnetic layer is decreased. For example, the heating can be conducted to the magnetization erasing temperature of the magnetic layer or around Curie temperature. The heating temperature is preferably 100° C. or more. The magnetic layer, which suffers easily the influence of an external magnetic field at 100° C. or less, tends to indicate a low stability of magnetic domains at room temperature.

However, the heating temperature is desirable to be low in a range capable of obtaining a predetermined reduction of the coercive force. If the heating temperature is too high, the diffusion of heat to an area other than the desired area for heating is apt to occur whereby there is a possibility of making the magnetic pattern unclear. Further, there is a possibility that the magnetic layer is deformed. Generally, a lubricant layer composed of lubricant is formed on the surface of the magnetic recording medium. Accordingly, the heating temperature should be low as possible in order to prevent an adverse effect by heating, such as deterioration of the lubricant. The lubricant may be deteriorated by decomposition or may evaporate causing weight reduction by heat. In particular, in a case of using proximity exposure, the vaporized lubricant may deposit on the mask. Accordingly, the heating temperature be low as possible. Thus, the magnetic pattern forming method of the present invention can be applied to the magnetic recording medium with a lubricant layer in an industrial scale.

Therefore, the heating temperature is preferably around or lower than Curie temperature of the magnetic layer.

Further, it is preferred that the heating temperature is not more than the thermal decomposition temperature of the lubricant layer in consideration of a possible adverse effect caused by the thermal decomposition of the lubricant layer formed on the magnetic recording medium. For this reason, the heating temperature by the irradiation of energy beams to the lubricant layer should be up to about 250° C. The thermal decomposition temperature of the lubricant layer means the lowest temperature in a temperature range in which any component contained in the lubricant layer is denatured by heat of energy beams.

In the present invention, since the maximum intensity of the second external magnetic field can be increased, the method is suitable for forming a magnetic pattern in a lower temperature range.

The direction of the second external magnetic field applied at the same time of heating is generally opposite to the direction of the first external magnetic field.

The second external magnetic field may contain only a pulse-like magnetic field component or may be a pulse-like magnetic field component and a static magnetic field component in combination. In the former case, for example, the pulse-like magnetic field is generated with an electromagnetic. In the later case, for example, a static magnetic field having a certain magnitude is formed with a permanent magnet or an electromagnet, and a magnetic field having the intensity higher than the static magnetic field is formed in a pulse form with an electromagnetic. In the later case, the sum of the pulse-like magnetic field component and the static magnetic field component constitutes the intensity of the second external magnetic field.

Or, the pulse-like magnetic field can be applied according to a method that a magnet which generates usually a magnetic field is brought to the proximity of the magnetic recording medium for a short time. For example, a magnetic field is applied to a portion of the magnetic recording medium with use of a permanent magnet while the medium is rotated at a predetermined speed.

Hereinbelow, the pulse width of the pulse-like magnetic field component of the second external magnetic field is referred simply to as the pulse width of the second external magnetic field. Here, the pulse width of the magnetic field indicates the full width at half maximum.

The maximum intensity of the second external magnetic field should be high in order to facilitate the formation of a magnetic pattern, and is preferably ⅔ or more as much as the static coercive force at room temperature although it varies depending on the characteristics of the magnetic layer of a magnetic recording medium. If the intensity is too weak, the heated area may not be magnetized well. More preferably, it is ¾ or more as much as the static coercive force at room temperature. A magnetic field stronger than the static coercive force at room temperature may be used. However, an applicable magnetic field should be smaller than the dynamic coercive force of the magnetic layer at room temperature because a larger second external magnetic field may affect adversely the magnetization of a non-heated area. As the pulse width of the second external magnetic field is made shorter, the upper limit value of the applicable magnetic field is increased. The value of the dynamic coercive force varies depending on an application time of magnetic field because as the pulse width of the second external magnetic field is made shorter, the dynamic coercive force of the magnetic layer at room temperature becomes large.

In the present invention, the value H (Oe) of a magnetic field intensity can be substituted with the value B (Gauss) of a magnetic density. Generally, there is the relation of $B = \mu H$ (where $\mu$ represents permeability). Since the formation of a magnetic pattern is generally carried out in air, the permeability is 1, and therefore, the relation of $B = H$ is established.

Figure 7:
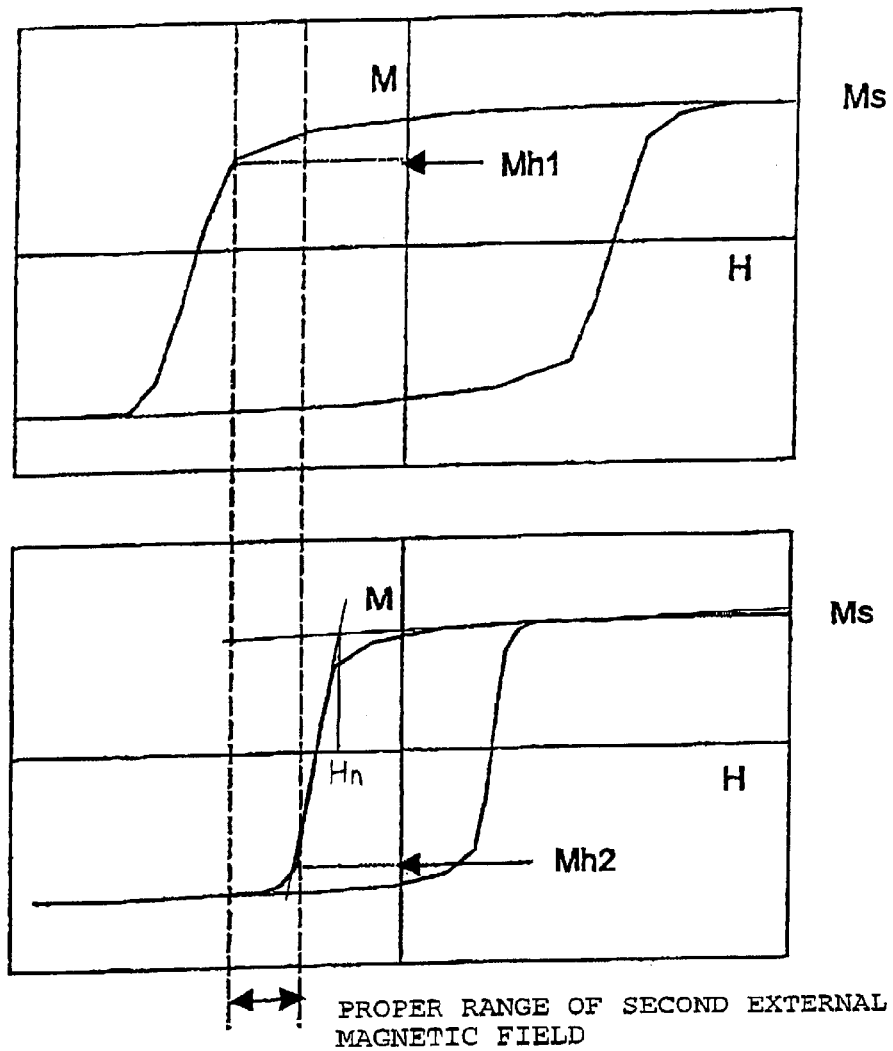
FIG. 7 shows a saturated magnetization curve of the magnetic layer at room temperature in an upper diagram and a saturated magnetization curve of a heated area of the magnetic layer at the temperature in a lower diagram.

Description will be made as to the relation between the temperature of heating a local portion and the heating time and between the maximum intensity of the second external magnetic field and the application time with reference to drawing. FIG. 7 shows, in an upper diagram, a diagram of the saturated magnetization curve of the magnetic layer at room temperature and in a lower diagram, a diagram of the saturated magnetization curve of the magnetic layer at the temperature of the heated area wherein the abscissa represents the intensity H of the external magnetic field and the ordinate represents the magnetization M of the magnetic layer at this moment.

FIG. 7 shows the preferred range of the maximum intensity of the second external magnetic field. Namely, it is understood that in the upper diagram, the maximum intensity of the second external magnetic field has to be weakened to such extent that the magnetic layer at room temperature does not cause demagnetization (weak magnetization) or is not magnetized in the opposite direction (i.e., to the extent that the magnetization of the magnetic layer at room temperature keeps Mh1 or more). However, in view of the lower diagram, the magnetic layer at the temperature of a heated area has to be strong to such extent of being magnetized in the opposite direction (i.e., to the extent that the magnetization of the magnetic layer at the temperature of the heated area is far from Mh2 in a negative direction.

When the saturation magnetic field is represented as Ms, it is preferable that Mh1 is 0.70 Ms or more, more preferably 0.85 Ms or more. This principle leads that the upper limit is limited to Ms. On the other hand, it is preferable that Mh2 is −0.70 Ms or lower, more preferably, −0.85 Ms or lower. This principle leads that the lower limit is limited to −Ms.

Figure 8:
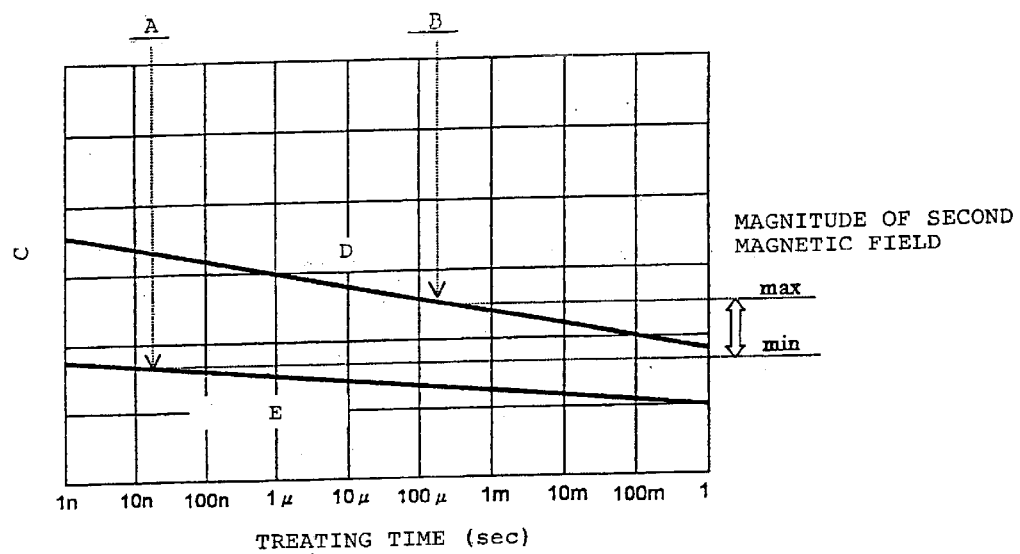
FIG. 8 is a semi-logarithmic graph showing the relation between the intensity of a magnetic field required for demagnetization or magnetization in an opposite direction and a treating time.

FIG. 8 is a semi-logarithmic graph showing the relation between the magnetic field intensity necessary for demagnetization or reverse magnetization and treating time. The upper graph shows a so-called room temperature characteristic which indicates diagrammatically that the magnetic field intensity which causes demagnetization of the magnetic layer at room temperature varies depending on a magnetic field application time (a treating time). The shorter the magnetic field application time is, the larger the magnetic field intensity necessary for causing demagnetization in the magnetic layer is.

The lower graph shows a so-called heating temperature characteristics which indicates diagrammatically that the magnetic field intensity necessary for magnetizing the magnetic layer at the room temperature of the heated area in a opposite direction varies depending on a heating time (a treating time). Namely, as the heating time (treating time) is longer, the temperature of the heated area becomes high and the coercive force is decreased, whereby the magnetic field intensity necessary for magnetizing in the opposite direction becomes smaller.

From FIG. 8, when the heating time and the application time of the second external magnetic field are determined, the preferred range of the maximum intensity of the second external magnetic field is determined (the range between the min and max in FIG. 8).

The pulse width of the second external magnetic field is generally 100 msec or less, preferably, 10 msec or less. The shorter the pulse width of the second external magnetic field is, the larger the upper limit of the applicable magnetic field is. It is because the value of dynamic coercive force varies depending on the magnetic field application time, and the shorter the pulse width of the second external magnetic field is, larger the dynamic coercive force of the magnetic field at room temperature is. The pulse width is preferably 1 msec or less. However, the pulse width is preferably 10 nsec or more. If the pulse width is too short, the dynamic coercive force becomes large with the result that the second external magnetic field necessary for magnetizing the heated area becomes large. Since the rising or falling of the magnetic field takes a certain time, which derives from the characteristics of a used electromagnet, although depending on the magnitude of the magnetic field, there is a limit to shorten the pulse width. Accordingly, the pulse width is preferably 100 nsec or more. Here, the pulse width of the magnetic field indicates the full width at half maximum.

When pulse-like energy beams are used for heating a local portion, the pulse width of the second external magnetic field should be the pulse width of usable pulse-like energy beams or more. If it is lower, the magnetic field may change during heating a local portion, and a good magnetic pattern is not obtainable.

Further, it is preferable that the pulse-like energy beams is synchronism with the pulse-like second external magnetic field and they are applied simultaneously. Thus, a magnetic field necessary for causing the reverse magnetization can effectively be applied before the coercive force of an area which has been heated by energy beams whereby the coercive force has once been decreased is recovered due to the reduction of temperature.

Generally, the pulse width of the magnetic field is considered to be longer than the pulse width of the energy beams. Accordingly, pulsed energy beams should be applied during the application of a pulsed magnetic field. In particular, it is preferable that the pulsed second external magnetic field is applied and the pulsed energy beams are applied before or at the time of the magnetic field being maximal. However, if the application of the pulsed energy beams is too early the temperature of the heated area decreases before the pulsed magnetic field becomes the maximum intensity, and the coercive force may recover. Accordingly, it is preferable that the time difference between the time of irradiating energy beams and the time of obtaining the maximum magnetic field is 30 μsec or less. More preferably, control should be made so that pulsed energy beams be applied at the moment that the magnetic field becomes maximal by the application of the pulsed second external magnetic field.

Further, it is preferable that the moment that the magnetic field becomes maximal and the moment that the temperature of the area irradiated by energy beams becomes the highest occur simultaneously.

In a case of forming a magnetic pattern by irradiating to a magnetic recording medium pulsed energy beams repeatedly, it is preferable that the pulse width of the second external magnetic field is generally ½ times or less with respect to the irradiation period of the pulsed energy beams, more preferably, 1/10 times or less, further preferably, 1/100 times or less.

By the satisfaction of such relation, the intensity of an applicable second external magnetic field can be flexible; a strong magnetic field can be applied without affecting adversely an area other than the heated area, and an excellent magnetic pattern can be formed. Description will be made with reference to FIG. 8.

As mentioned before, FIG. 8 is a semi-logarithmic graph showing the relation between the magnetic intensity necessary for demagnetization or reverse magnetization in an opposite direction and the treating time. For example, when the irradiation period of energy beams is 100 msec, and the second external magnetic field is applied with the same pulse width of 100 msec, the margin of the intensity of the applicable second external magnetic field is only about ⅓ in scale. However, when the second external magnetic field is applied with a pulse width of 1 msec which is 1/100 times as much as the irradiation period of the energy beams, the margin of the intensity of the applicable second external magnetic field can be widened to about 1 in scale. Accordingly, even when the intensity of the second external magnetic field has a certain fluctuation, there might not affect adversely the magnetization direction of a non-heated area, and it is possible to form a good magnetic pattern stably.

The present invention is in particular advantageous in the application to a magnetic recording medium having a high dynamic coercive force or an AFC medium.

For example, a magnetic recording medium with two magnetic layers: a magnetic layer for recording and a stabilizing magnetic layer to keep a thermal stability, may be mentioned. Since the stabilizing magnetic layer serves to suppress the instantaneous reverse magnetization of the recording magnetic layer, the dynamic coercive force is strong. According to the conventional method, it is difficult to form a magnetic pattern. In such medium, when an external magnetic field having an intensity near or in the proximity of the static coercive force is applied in a pulse-like form, an excellent magnetic pattern can be formed.

The present invention is preferably applicable to the formation of a magnetic pattern having information for controlling a recording/reproducing magnetic head, for example, a magnetic pattern capable of generating signals corresponding to positions of the magnetic head.

The information for controlling is to control a recording/reproducing means such as a magnetic head by using the information. For example, it includes a servo information for positioning the magnetic head on a data track, an address information showing the position of the magnetic head on the medium, an synchronous information for controlling the speed of recording or reproducing by the magnetic head, and so on. Further it includes a standard information based on which the serve information is written later.

The magnetic pattern usable for controlling should be formed with high accuracy. In particular, the servo pattern is a pattern for controlling positions on data tracks. If the servo pattern is inaccurate, position control for the head becomes rough and a data pattern of higher accuracy than the servo pattern can not be recorded logically. Accordingly, as the recording density of the medium is increased, the servo pattern should be formed with high accuracy.

In the present invention, since a highly accurate servo pattern or a standard pattern can be obtained, the present invention provides a remarkable effect when it is applied to, in particular, a magnetic recording medium for high density recording such as one having a track density of 40 kTPI or more.

More detailed explanation will be made as to the second external magnetic field.

When the medium is of a disk-like form, the direction of applying the external magnetic field is preferably either among circumferential, radial and vertical directions with respect to the disk surface.

The second external magnetic field may be applied in a pulse form by using, for example, an electromagnet. A combination of a permanent magnetic and an electromagnet may be used. A magnetic field having a certain intensity is usually (statically) applied by means of the permanent magnet, and in addition to this, a pulse-like magnetic field is applied by means of the electromagnet.

An air-core coil having a small inductance is preferably used since the pulse width can be narrowed and the magnetic field application time can be shortened.

Further, a yoke type electromagnetic may be used for the permanent magnet. The later can make a magnetic field to be applied in a pulse form small in comparison with the former. Generally, it is difficult for the electromagnet to shorten the pulse width as the magnetic field is stronger. Accordingly, the pulse width can easily be shortened by the later.

In a case that the second external magnetic field is formed by the combination of a static magnetic field and a pulse-like magnetic field, the magnetic field intensity of the static magnetic field should be smaller than the static coercive force of the magnetic layer at room temperature. Preferably, it is $2/3$ or less of the static coercive force, more preferably, $1/2$ or less. If it is too large, a formed magnetic pattern is influenced adversely whereby the output is reduced and the modulation becomes poor. There is no lower limit. However, when the magnetic field intensity is too weak, the formation of the static magnetic field is useless. Accordingly, it should be at least $1/8$ of the static coercive force of the magnetic layer at room temperature, for instance.

As far as we do not mention in particular in this specification, the intensity of the magnetic field is expressed by an absolute value without any sign. By the way, when an area which has been magnetized in a direction is applied with an external magnetic field in the opposite direction and the intensity of the external magnetic field is gradually increased from zero, the reversal of magnetic domains begins gradually. The intensity of the external magnetic field at which the reversal of magnetic domains occurs first is referred to as the nuclear generating magnetic field (intensity) Hn. In a B-H loop, this Hn is expressed as the bending point.

In FIG. 7, when the direction of uniform magnetization is expressed by a positive sign and the direction of reverse magnetization is expressed by a negative sign, the direction of applying the second external magnetic field is expressed by a negative sign. In this case, it is preferable for a magnetic recording medium wherein the nuclear generating magnetic field Hn is at a negative side that the static magnetic field has a negative sign and the magnetic field intensity (absolute value) is smaller than the nuclear generating magnetic field Hn. When the intensity of the static magnetic field is smaller than that of the nuclear generating magnetic field Hn, a magnetic pattern can be formed with higher accuracy because there is little influence to the direction of uniform magnetization formed previously.

In the contrary case, when the direction of uniform magnetization is expressed by a negative sign and the direction of reverse magnetization is expressed by a positive sign, the direction of applying the second external magnetic field is expressed by a positive sign. In this case, it is preferable for a medium wherein the nuclear generating magnetic field Hn is at a positive side that the static magnetic field has a positive sign and the intensity of the magnetic field (absolute value) is smaller than the nuclear generating magnetic field Hn (absolute value).

In the embodiments of the present invention, the intensity of the second external magnetic field is the sum of the static magnetic field and the pulse-like magnetic field. Accordingly, when the intensity of the static magnetic field is determined, the intensity of the pulse-like magnetic field required for the reversal of magnetization can simultaneously be determined. It is preferable that the electromagnet be so designed that the power is kept to the minimum in a range capable of generating a pulse-like magnetic field having a necessary intensity. With this, the size of the electromagnet capable of generating a pulse-like magnetic field having an intensity necessary for the reversal of magnetization can be determined and the inductance of the electromagnet can be suppressed to a required minimum value, whereby the pulse width can be shortened. The maximum intensity of the electromagnet is correlated with the inductance, and the smaller the maximum intensity is, the smaller the inductance is. Therefore, it is possible to generate a magnetic field having a shorter pulse width. A magnetic field having a shorter pulse width has an advantage as follows. In the application of a magnetic field together with heating, the application of a pulse-like magnetic field can be finished before a heated portion spreads undesirably by the heat conduction. Accordingly, a desirable pattern can easily be obtained. Further, a finer magnetic pattern can correctly be formed.

Here, when the square rate of the magnetic recording medium is better, the nuclear generating magnetic field Hn is relatively large, whereby an applicable static magnetic field is large. Accordingly, the intensity of the static magnetic field relative to the second external magnetic field necessary for causing the reversal of magnetization can be increased, so that the intensity of an applicable pulse-like magnetic field can be suppressed to be smaller. Namely, it is enough to use an electromagnet having a smaller power. Such electromagnet can shorten the pulse width, whereby a finer magnetic pattern can be formed. In order to form a fine magnetic pattern, it is preferable to use a magnetic recording medium having a square rate of 0.8 or more, more preferably, a magnetic recording medium having 0.9 or more. Generally, a perpendicular magnetic recording medium has a good square rate, and therefore, it is suitable for this purpose.

In order to magnetize efficiently a medium having a high coercive force which is suitable for high density recording, a permanent magnet such as a magnet of ferrite, a magnet of neodymium type rate earth, a magnet of samarium-cobalt type rare earth or the like is preferable.

It is preferable to attach a chip of ferromagnetic material such as iron at an end of the permanent magnet or to change the shape of the end portion of the permanent magnet because the magnetic field intensity is weaker at the end portion of the permanent magnet. With this, the magnetic field intensity in the vicinity of the end portion of the permanent magnet can be increased, and the intensity of an applicable magnetic field can be made uniform over the entire pattern forming area even in a case that a magnetic pattern is formed by utilizing the end portion or the vicinity of the permanent magnet from the restriction of the structure of the device.

An external magnetic field may be applied together with the second external magnetic field over a wide heated area, whereby a plurality of magnetic patterns can be formed at a time.

In a case that local heating is conducted to the entire surface of a magnetic recording medium at a time, it is desirable apply the second external magnetic field on the entire surface of the medium at the same time of the heating so as to form a magnetic pattern. In this case, it is possible to form the magnetic pattern in a shorter time and to reduce cost. In a case of applying a magnetic field to only a part of the medium, the arrangement of a magnet or magnets is contrived or a unique instrument is used in many cases so that the magnetic field does not extend to the other area. However, it is unnecessary to take such special measures when the magnetic field is applied to the entire surface of the medium. Further, since it is unnecessary to use a rotating or moving means, the construction of the device can be simplified, and magnetic recording media can be produced economically.

When the medium is, for example, a small disk-like magnetic recording medium having a diameter of 2.5 inches or less, energy beams can be irradiated along with the application of a magnetic field to the entire surface of the disk by using a simple arrangement or means. The medium is preferably of a diameter of 1 inch or less.

When a magnetic field is to be applied to a disk-like magnetic recording medium in its circumferential direction, a large pulsed current should be supplied in a vertical direction to the center of the medium whereby a magnetic field in a circumferential direction can easily be formed. This technique is preferably applicable to, in particular, a small disk-like magnetic recording medium having a diameter of 1 inch or less.

Next, the magnetic pattern forming device of the present invention will be described.

The magnetic pattern forming device of the present invention comprises a holding means for holding a magnetic recording medium, an energy beam source for emitting energy beams, a projection means for projecting and irradiating the energy beams from the energy beam source to the magnetic recording medium, and a magnetic field generating means for generating a pulse-like magnetic field component to be applied to the magnetic recording medium.

First, the magnetic recording medium which is previously magnetized in a direction is fixed by the holding means. A pulse-like magnetic field is applied to the magnetic recording medium by means of the magnetic field generating means. At the same time, energy beams emitted from the energy beam source are irradiated by means of the projection means to the fixed magnetic recording medium so that the medium is heated locally. As a result, the magnetization direction in the area where the coercive force is decreased by heating is reversed. In this case, it is preferable to dispose a mask between the energy beam source and the magnetic recording medium so that the intensity distribution of the energy beams is changed in response to a magnetic pattern to be formed whereby a plurality of heated areas can be formed at a time. Further, when an electromagnet is used as the magnetic field generating means, a magnetic field having a pulse-like magnetic field component can easily be applied. When a combination of a permanent magnet and an electromagnet is used, a pulse-like magnetic field having a large intensity can be applied.

Several embodiments of the magnetic pattern forming device of the present invention will be described. However, the present invention is not limited to these embodiments as long as modifications are not beyond the range of the present invention.

In the following, a magnetic pattern forming device according to the present invention will be described with reference to drawings.

Figure 2:
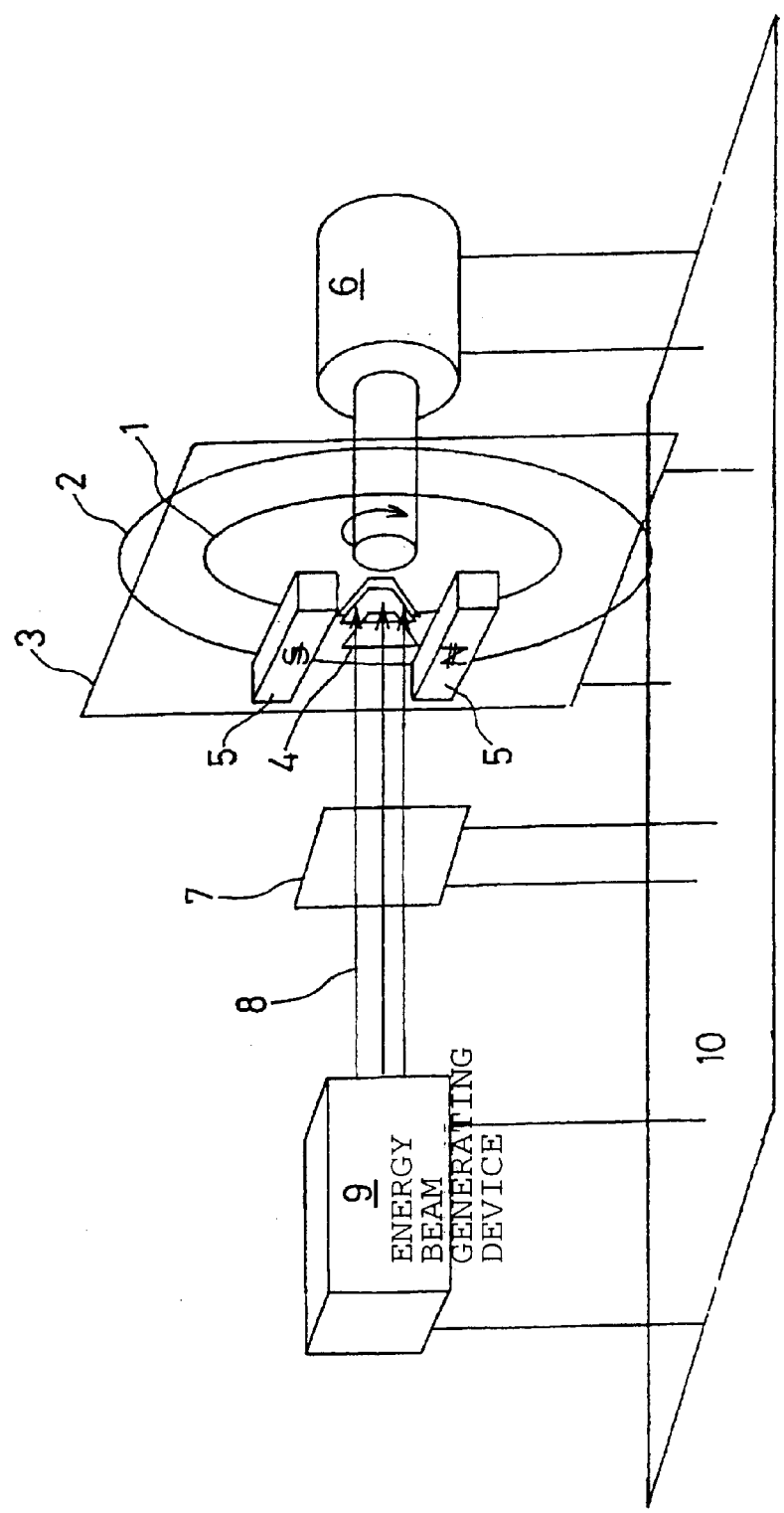
FIG. 2 is a diagrammatical perspective view of the magnetic pattern forming device shown in FIG. 1.

FIG. 1 is a diagrammatical view partly cross-sectioned showing an embodiment of the magnetic pattern forming device according to the present invention, and FIG. 2 is a perspective view of the device shown in FIG. 1.

A non-transmissive layer 2A having an engraved pattern is overlaid on a transparent substrate 2B on which a photomask 2 is formed, and they are fixed to the shaft of a motor 6 together with a magnetic recording medium 1 so that the non-transmissive layer 2A is apart from the magnetic recording medium 1 by a predetermined distance by using a spacer 1A. A vacuum pipe 13 is provided in the shaft of the motor 6. The magnetic recording medium 1 and the photomask 2 are fixed to the motor shaft by the action of vacuum. Accordingly, when the motor 6 is rotated, the magnetic recording medium 1 and the photomask 2 are rotated simultaneously. The operation of the motor may be an intermittent operation repeating rotation and stop by a predetermined angle or a continuous operation rotating them uniformly.

In FIGS. 1 and 2, the motor (spindle motor) 6 is disposed at a side of magnetic recording medium 1. However, it may be disposed at a side of photomask 2. In large-scale production, the arrangement of the later case is preferable because it is easy to replace the magnetic recording medium 1 by another.

Energy beams 8 irradiated from an energy beam generating means (energy beam source) 9 are passed through a homogenizer 7 where the energy density is equalized. The equalized energy beams are passed through an opening 4 having a predetermined shape, formed in a shading plate 3. Energy beams which pass through patterned openings in the non-transmissive layer 2A on the photomask reach the surface of the magnetic recording medium 1. Thus, only the surface of the portion of the magnetic recording medium 1 irradiated by the energy beams 8 is heated.

In FIGS. 1 and 2, the magnetic field generating means 5 for applying a magnetic field to the magnetic recording medium is disposed between the photomask 2 and the shading plate 3. However, it may be or may not be fixed to the shading plate 3. The magnetic field generating means 5 may be disposed at only a rear surface side of the magnetic recording medium 1 or at both sides. The spindle motor 6, shading plate 3, homogenizer 7 and energy beam generating means (energy beam source) 9 are fixed to a supporting table 10. A sectorial opening 4 is formed in the shading plate 3, and energy beams passed through the sectorial opening 4 to have a sectorial surface area reach the photomask 2. The photomask 2 and the magnetic recording medium 1 are rotated simultaneously in a state of being fixed to the shaft of the spindle motor 6 during which the sectorial energy beams 8 are irradiated onto the entire surface of the magnetic recording medium 1.

In order to form a good magnetic pattern, the distance between the mask and the magnetic recording medium should be uniform on the concentrical circle. For this purpose, it is preferable to dispose a monitoring device for observing an interference fringe which may generate on the magnetic recording medium although it is not shown in drawing. When the distance between the mask and the magnetic recording medium is uniform on the concentrical circle, an interference fringe of concentrical circle generates on the magnetic recording medium. On the other hand, when the distance between the mask and the magnetic recording medium is ununiform on the concentrical circle, an interference fringe of non-concentrical circle generates on the magnetic recording medium. Accordingly, the provision of the monitoring device for observing an interference fringe makes adjustment easy so that the distance between the mask and the magnetic recording medium is uniform on the concentrical circle.

Next, the magnetic field generating means and the magnetic pattern forming method of the present invention will be described.

Figure 3A:
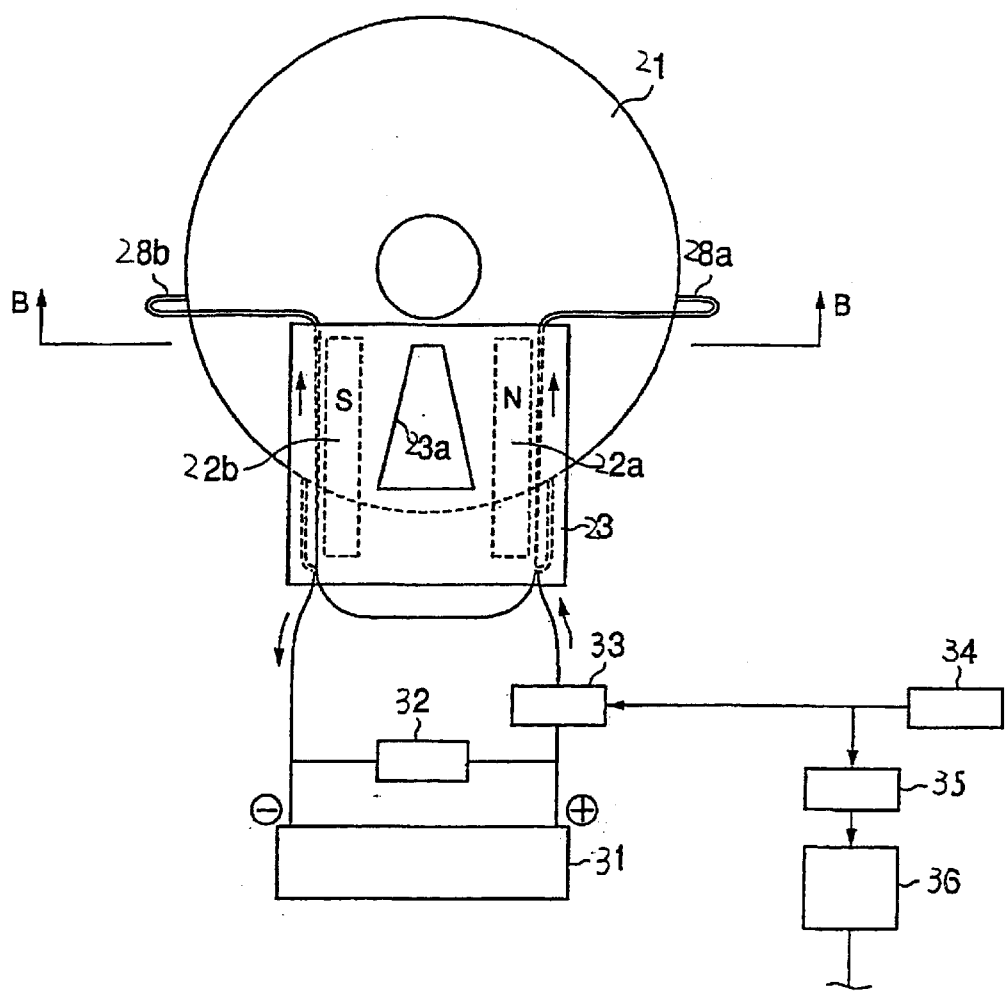
FIGS. 3(a) and 3(b) are a plan view and a cross-sectional view showing the method for forming a magnetic pattern according to a first embodiment of the present invention.
Figure 3B:
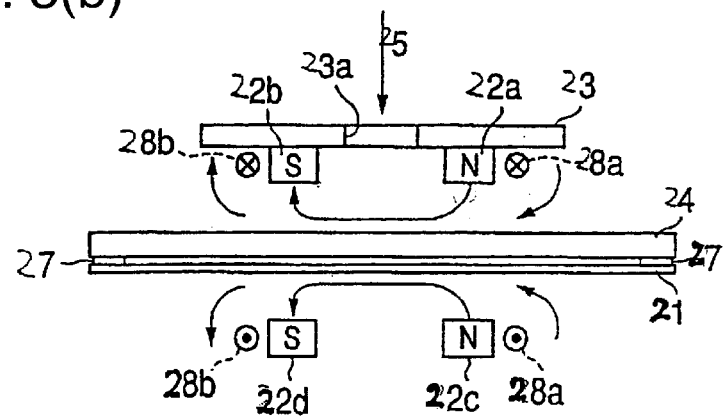

FIG. 3(a) is a plan view showing the magnetic pattern forming method according to a first embodiment of the present invention and FIG. 3(b) is a cross-sectional view taken along a line B—B.

A photomask 24 is placed on a longitudinal magnetic recording medium 21 by interposing a spacer 27. A shading plate 23 is disposed above the photomask 24, and energy beams 25 are irradiated through an opening 23a of the shading plate 23. In the photomask 24, a transmissive portion and a non-transmissive portion are formed so as to form a magnetic pattern.

Permanent magnets 22a (N pole) and 22b (S pole) are attached to the shading plate 23 at both sides of the opening 23a, and air-core coils (electromagnets) 28a, 28b each formed by winding a wire plural times in a loop form are disposed adjacent to the permanent magnets 22a, 22b. Further, permanent magnets 22c (N pole) and 22d (S pole) are attached to the opposite face of the magnetic recording medium 21, and air-core coils (electromagnets) 28a, 28b each formed by winding a wire plural times in a loop form are disposed adjacent to the permanent magnets 22c, 22d.

The air-core coils 28a, 28b are mutually connected with a conducting wire, and their both ends are connected to a d.c. power source 31, a capacitor 32 and a thyristor 33 as shown in FIG. 3. The air-core coils 28a, 28b are respectively bent in a U-like form so as to be attached to or detached from the magnetic recording medium 21 easily.

In this case, it is preferable to provide a cover made of a non-magnetic material such as stainless steel around the air-core coils. The provision of the cover around the air-core coils is advantageous in the following point. When an electric current is supplied to the air-core coils, they may cause vibrations to thereby scatter dust in air whereby the dust may deposit on the magnetic recording medium or the mask whereby a defect of printing may cause. Thus, the provision of the cover prevents the deposition of dust on the magnetic recording medium. Further, it is preferable to adopt such measures that air inside the cover is sucked together with the dust.

The magnetic recording medium 21 has, for example, a static coercive force at room temperature of 3,000 Oe and a dynamic coercive force of 8,000 Oe, and is previously magnetized uniformly in a predetermined direction by means of an electromagnet of about 10 kOe. To the magnetic recording medium, a magnetic field of an intensity of about 1,500 to 2,000 Oe is always applied in a direction opposite to the direction of uniform magnetization by means of the permanent magnets 22a to 22d.

In order to apply a pulse-like external magnetic field, a potential difference of, for example, about several hundred volts is given to the capacitor 32 by means of the d.c. power source 31. Then, a trigger signal is generated from a trigger device 34 at a timing of applying an external magnetic field. When the trigger signal is inputted to the gate terminal of the thyristor 33, the electric current flows instantaneously to the air-core coils 28a, 28b due to a potential difference in the capacitor 32. The supply of the pulse-like current produces a pulse-like magnetic field with, for example, a pulse width of 200 μsec and the maximum intensity of about 1,000 Oe around the coils.

As shown in FIG. 3(b), since the magnetic field produced by the air-core coils 28a, 28b serves as an auxiliary magnetic field for the magnetic field by the permanent magnets 22a to 22d, a pulse-like magnetic field having the maximum intensity of about 3,000 Oe in total is applied.

On the other hand, the trigger signal from the trigger device 34 is inputted to an energy beam source 36 for emitting, for example, excimer laser (wavelength: 248 nm) through a delay device 35 whereby pulse-like energy beams are generated. The energy beams are passed through a programmable shutter, a beam expander, a prism array and so on (not shown), and are irradiated as pulse-like energy beams 25 having, for example, a pulse width of several tens nsec and an energy density of 100 to 200 mJ/cm$^2$.

Usually, the rising or falling of the magnetic field generated by an electromagnet takes a certain time due to its characteristics. Accordingly, the emission time of the energy beams should be adjusted by using the delay device 25 so that the energy beams 25 are irradiated just when the magnetic intensity becomes maximal. With such adjustment, a pulse-like magnetic field of about 3,000 Oe in total can be applied at the same time of the irradiation of the energy beams 25. Since the dynamic coercive force of the heated area in the magnetic recording medium 21 is reduced to 3,000 Oe or less, only the heated area is magnetized reversely by the pulse-like magnetic field whereby a magnetic pattern is formed. By the way, a pulse-like current may be supplied directly from the d.c. power source without using the capacitor.

Figure 4A:
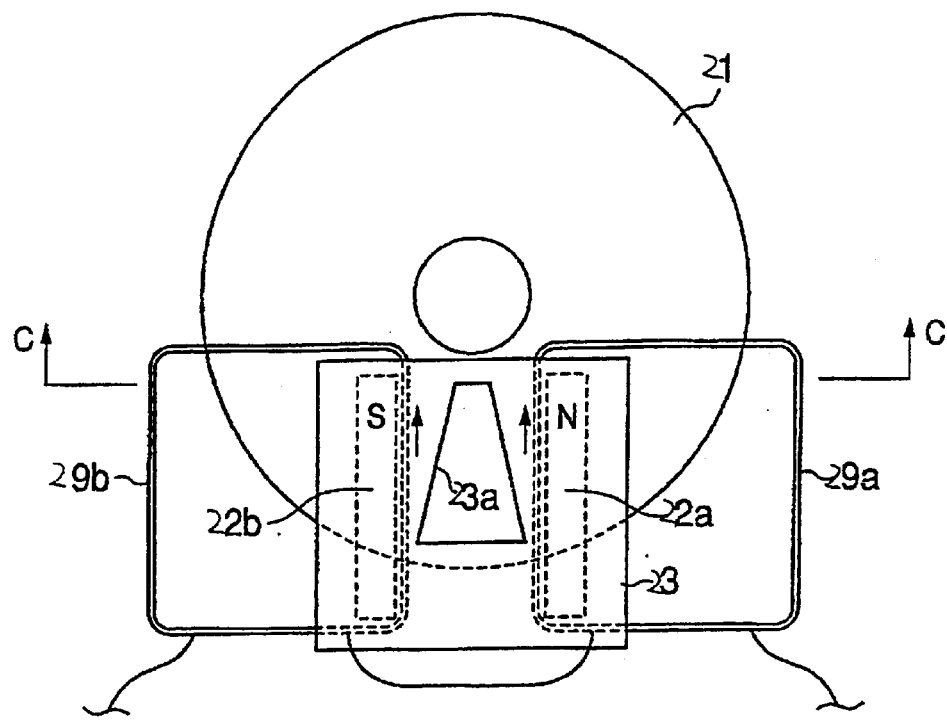
FIGS. 4(a) and 4(b) are a plan view and a cross-sectional view showing the method for forming a magnetic pattern according to a second embodiment of the present invention.
Figure 4B:
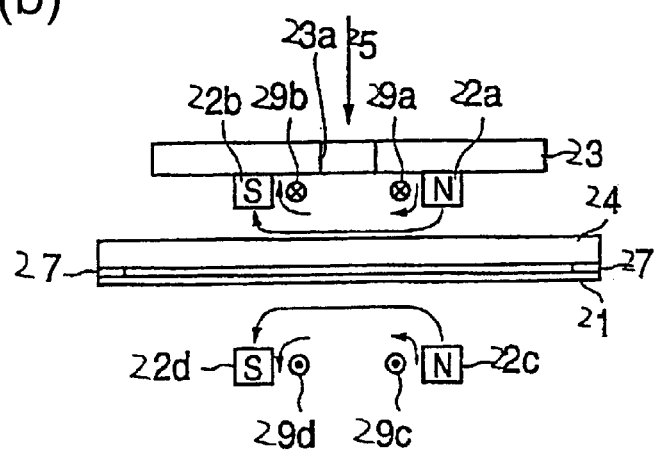

FIG. 4(a) is a plan view showing the magnetic pattern forming method according to a second embodiment of the present invention and FIG. 4(b) is a cross-sectional view taken along a line C—C. The second embodiment is the same as the first embodiment except that air-core coils 29a to 29d are used instead of the air-core coils 28a and 28b.

A photomask 24 is placed on a longitudinal magnetic recording medium 21 by interposing a spacer 27. A shading plate 23 is disposed above the photomask 24. Energy beams 25 are irradiated to the photomask 24 through an opening 23a of the shading plate 23. A transmissive portion and a non-transmissive portion are formed in the photomask 24 so as to correspond to a magnetic pattern to be formed.

Permanent magnets 22a (N pole) and 22b (S pole) are attached to the shading plate 23 at both sides of the opening 23a. Air-core coils (electromagnetic) 29a, 29b each formed by winding a wire plural times in loop form are disposed adjacent to the permanent magnetic 22a, 22b. Permanent magnets 22c (N pole) and 22d (S pole) are attached to the opposite face of the magnetic recording medium 21, and air-core coils (electromagnets) 29c, 29d each formed by winding a wire plural times in a loop form are disposed adjacent to the permanent magnets 22c, 22d.

The air-core coils 29a to 29d are mutually connected with conducting wires, and they have their both ends connected to a d.c. power source, a capacitor, a thyristor and so on (not shown) in the same manner as in FIG. 3.

The structure of the magnetic recording medium 21 and the method for applying a pulse-like external magnetic field and pulse-like energy beams are the same as in the first embodiment 1.

In the first embodiment, the air-core coils 28a, 28b are disposed extending to upper and lower portions of the medium. However, in this embodiment, air-core coils 29a, 29b are at an upper side of the medium and air-core coils 29c, 29d are at a lower side of the medium respectively. Accordingly, the attachment or detachment of the medium is easier than that of the first embodiment.

Figure 5A:
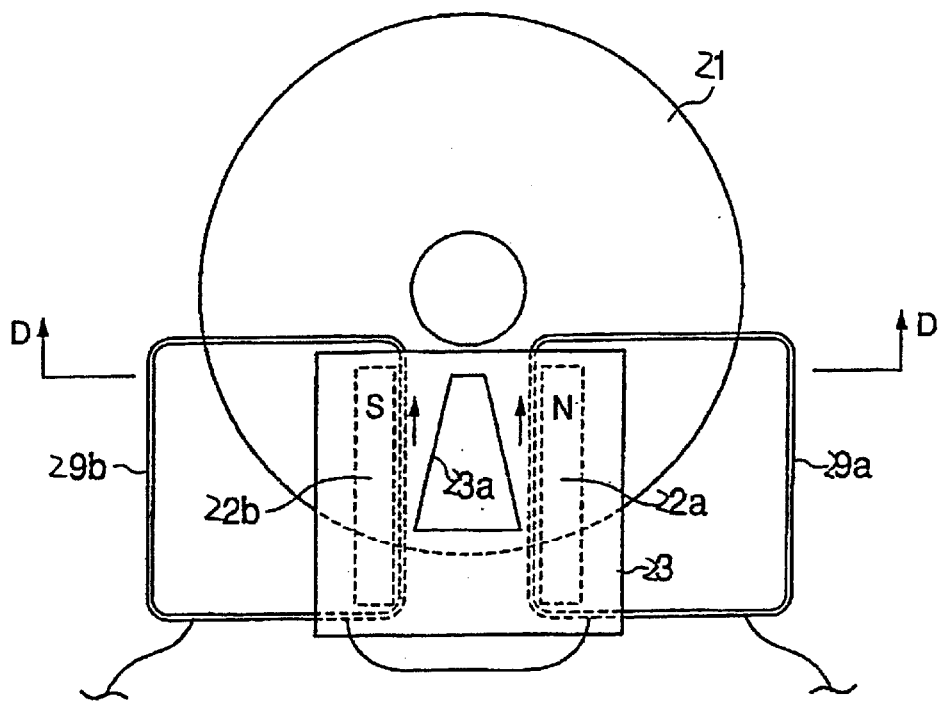
FIGS. 5(a) and 5(b) are a plan view and a cross-sectional view showing the method for forming a magnetic pattern according to a third embodiment of the present invention.
Figure 5B:
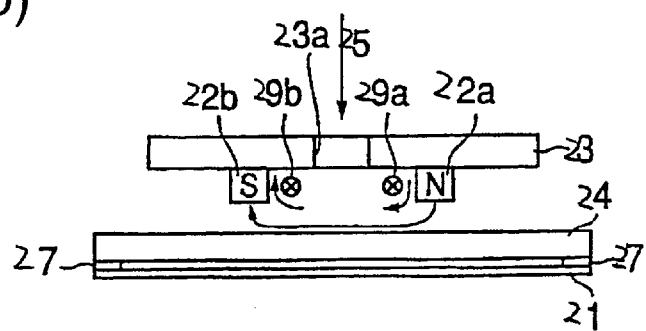

FIG. 5(a) is a plan view showing the magnetic pattern forming method according to a third embodiment of the present invention and FIG. 5(b) is a cross-sectional view taken along a line D—D. The third embodiment is the same as the second embodiment except that permanent magnets 22a, 22b and air-core coils 29a, 29b are disposed at only an upper side of the medium.

A photomask 24 is placed on a longitudinal magnetic recording medium 21 by interposing a spacer. A shading plate 23 is disposed above the photomask 24. Energy beams 25 are irradiated to the photomask through an opening 23a formed in the shading plate 23. A transmissive portion and a non-transmissive portion are formed in the photomask 24 so as to correspond to a magnetic pattern to be formed.

Permanent magnets 22a (N pole) and 22b (S pole) are attached to the shading plate 23 at both sides of an opening 23a. Air-core coils (electromagnets) 29a, 29b each formed by winding a wire plural times in a loop form are disposed adjacent to the permanent magnets 22a, 22b.

The air-core coils 29a, 29b are mutually connected with a conducting wire, and they have both ends connected to a d.c. power source, a capacitor, a thyristor and so on (not shown) in the same manner as in FIG. 3.

The structure of the magnetic recording medium 21 is the same as that of the first embodiment and is previously magnetized uniformly in a predetermined direction by an electromagnet of about 10 kOe. A magnetic field of about 1,500 to 2,000 Oe is always applied to the magnetic recording medium in the direction opposite to the direction of uniform magnetization by means of the permanent magnets 22a, 22b.

Then, a pulse-like external magnetic field and pulse-like energy beams are applied in the same manner as in the first embodiment. A pulse-like magnetic field having, for example, a pulse width of 200 μsec and the maximum intensity of about 1,000 Oe is generated around the coils.

As shown in FIG. 5(b), since the magnetic field formed by the air-core coils 29a, 29b serves as an auxiliary magnetic field of the magnetic field by the permanent magnets 22a, 22b, a pulse-like magnetic field having the maximum intensity of about 3,000 Oe in total is applied.

In this case, a short pulse-like magnetic field having a short pulse width of 1 sec or less is applied. Then, an eddy current having the direction opposite to the current flowing in the air-core coils 29a, 29b is generated in the magnetic recording medium 21. The eddy current generates a magnetic field which cancels a vertical magnetic field component produced by the coils. Further, since a horizontal magnetic field component by the eddy current has the same direction as the horizontal magnetic field component by the coils, they serve effectively as the second external magnetic field.

Such phenomenon is obtainable by disposing coils at one side of the magnetic layer and disposing a conductive plate at the opposite side. However, when the substrate of the medium is a conductive substrate such as, for example, aluminum alloy, the same phenomenon is obtainable because this substrate serves as the conductive plate.

The third embodiment provides a simple structure because the second external magnetic field applying means is disposed at only a side of the medium.

This embodiment may cause vibrations in the medium due to the eddy current. If there is a danger of causing an adverse effect by the vibrations of the medium, the second embodiment is preferably used. In the second embodiment wherein the magnets are disposed both sides with respect to the medium, the eddy current in the medium is canceled and there is little possibility of causing vibrations in the medium.

The positions of the air-core coils in FIGS. 3 to 5 are shown as examples, and the positions are not in particular limited as far as magnetic field can be applied in the combination of the magnetic field of the permanent magnets.

Further, a pulse-like magnetic field may be applied by using a plurality of coils having different number of turn wherein a pulse-like magnetic field component having a longer pulse width and a pulse-like magnetic field component having a shorter pulse width are combined. With this, a pulse-like magnetic field component used for reverse magnetization can actually be shortened.

Next, a fourth embodiment of the present invention will be described.

This embodiment is applicable to a disk-like longitudinal magnetic recording medium having the central opening. The structure of the medium is the same as that of the first embodiment and is previously magnetized uniformly in a predetermined direction. A conductive member such as a conductive coil is disposed so that it is inserted into the central pole in a direction perpendicular to the surface of the medium. The conductive coil is connected to a d.c. power source, a capacitor, a thyristor and so on in the same manner as in the first embodiment, and the medium is applied with a pulse-like external magnetic field and pulse-like energy beams in the same manner as the first embodiment.

When a pulse-like current is supplied to the conductive member, a pulse-like magnetic field is generated around the medium in its circumferential direction.

According to this embodiment, the second external magnetic field can simultaneously be applied to the entire surface of the medium. Accordingly, this embodiment is preferably applied to the medium having a diameter of 2.5 inches or less.

In the following, explanation will be made as to the method for heating locally the magnetic layer according to the present invention.

It is sufficient for a heating means to have the function of heating locally the surface of the magnetic layer. However, in consideration of the thermal diffusion to undesired portions and controllability, it is preferable to use energy beams such as laser because power control and the size of an area to be heated can easily be controlled. In this case, use of a mask is preferable because a plurality of magnetic patterns can be formed at a time by irradiating the energy beams through the mask, whereby a magnetic pattern forming step can be shortened and is simple.

Further, it is preferable to control the position of a heated area or heating temperature by rendering the energy beams to be a pulse-like form rather than continuous irradiation.

In particular, use of a pulsed laser light source is desirable. The pulsed laser light source is to oscillate intermittently laser in a pulse form and is very preferable because laser having a high peak power value can be irradiated in a very short time and the storage of heat is minimized, in comparison with the case that continuous laser is changed to a pulse form by an optical device such as an acoustic optical device (AO) or an electro-optical device (EO).

When the continuous laser is changed to a pulse form by such optical device, the pulsed laser has substantially the same power as the continuous laser over its pulse width. On the other hand, in the pulsed laser light source, for example, energy is stored by resonance in the light source, and laser beams are emitted at a time as a pulse. Accordingly, the power is very large at its peak power value in each pulse, and decreases after then. In the present invention, use of the pulsed laser light source is suitable because in the formation of a magnetic pattern having a high contrast and accuracy, it is preferred to heat quickly and cool quickly.

The medium surface in which a magnetic pattern is formed should have a large temperature difference between an irradiation time and a non-irradiation time of pulse-like energy beams in order to increase the contrast of the pattern or increase the recording density. Accordingly, in a non-irradiation time of pulse-like energy beams, temperature should be kept around room temperature or lower. The room temperature is about 25° C.

The pulse width of pulse-like energy beams is desirably 1 $\mu$sec or less. When the pulse width is wider than that value, heat by the energy given by the pulse-like energy beams disperses in the magnetic recording medium whereby resolution is apt to decrease. When the power per 1 pulse is equal, the pulse width should be made short so as to generate a strong energy at a time. Then, the dispersion of heat is small and the resolution of the magnetic pattern tends to increase. More preferably, the pulse width is 100 nsec or less. In that range of pulse width, it is easy to form a magnetic pattern having a high resolution even when a substrate made of metal such as Al having a relatively large thermal diffusion is used. When a pattern having the minimum width of 2 $\mu$m or less is to be formed, the pulse width should be determined to be 25 nsec or less. Namely, in considering the resolution significantly, the pulse width should be short as possible. Further, the pulse width is preferably 1 nsec or more because it is preferable to keep heat until the reversal of magnetization in the magnetic layer is completed.

As a kind of pulsed laser, there is laser capable of generating at a high frequency ultra-short pulses in a level of pico sec or femto sec such as mode-locked laser. In a period in which ultra-short pulses are irradiated at a high frequency, the laser is not given in a very short time between each ultra-short pulse. However, since the non-irradiation time is very short, the temperature of a heated portion does not decrease. Namely, an area which is once heated to Curie temperature or more can be kept at the Curie temperature or more.

In such case, accordingly, a continuous irradiation period (a continuous irradiation period including a time in which laser between each ultra-short pulse is not irradiated) is determined as 1 pulse. Further, the integration value of irradiation energy quantity in the continuous irradiation period is determined as power (mJ/cm$^2$) per pulse.

Although the power of energy beams can be chosen with the optimum value depending on the magnitude of an applicable external magnetic field, it is preferable that the power of pulse-like energy beams per pulse is 1,000 mJ/cm$^2$ or less. The application of a larger power than that power may damage the surface of the magnetic recording medium by the pulse-like energy beams to cause deformation. When the surface roughness or unevenness is increased by the deformation, there may cause troubles in moving a flying/contact head.

Therefore, the power is preferably 500 mJ/cm$^2$ or less, more preferably, 200 mJ/cm$^2$ or less. In this range, a magnetic patter having a high resolution is easily formed even in a case of using a substrate having relatively large thermal diffusion properties. Further, the power is preferably 10 mJ/cm$^2$ or more. When it is smaller than that value, temperature rise in the magnetic layer is suppressed and it is difficult to obtain magnetic printing. Since influence by the diffraction of energy beams varies depending on the pattern width, the optimum power also varies depending on the pattern width. The shorter the wavelength of energy beams is, the lower the upper limit of an applicable power is.

When the substrate used in the present invention is composed of metal such as Al or an alloy, the substrate has a large thermal conductivity. Accordingly, the power is preferably in a range of 30 to 120 mJ/cm$^2$ so as not to cause the deformation of a magnetic pattern, which is caused by heat spreading to an undesired area, or not to cause a physical damage to the substrate by an excessive energy.

In fact, the most part of the energy beams is interrupted by the non-transmissive portion of the mask and only a portion passing through the transmissive portion is irradiated to the medium. Accordingly, the power given to the substrate tends to be small. As the width of a magnetic pattern to be formed is narrowed, i.e., the transmissive portion of the mask is narrowed, the transmission of the energy beams through the transmissive portion is difficult, and actually irradiated power is smaller.

In a case that the substrate is made of ceramics such as glass, the power is preferably in a range of 10 to 100 mJ/cm$^2$ because the thermal conduction is small in comparison with a substrate of Al or the like, and the storage of heat at the position where the pulse-like energy beams are irradiated, is large.

In a case that the substrate is made of resin such as polycarbonate, the power is preferably in a range of 10 to 80 mJ/cm$^2$ because the storage of heat at the position where the pulse-like energy beams are irradiated, is large and the melting point is low in comparison with glass.

A preferable range of the power is influenced by a time until the pulse-like energy beams have a desirable power for irradiation, i.e., a rising time of pulse. The above-mentioned desirable range of power is such value when the rising time is 5 nsec.

Further, when a damage to the magnetic layer, protective layer or lubricant layer by the energy beams is feared, it is possible to take a way to increase the intensity of magnetic field applied at the same time of the application of the pulse-like energy beams while the power of the pulse-like energy beams is made small. For example, a large magnetic field as large as possible in an admissible range is applied to reduce irradiation energy.

When the energy beams are irradiated through the protective layer and the lubricant layer, there is a case that lubricant is coated on again after the irradiation in consideration of a damage (decomposition, polymerization or the like) to the lubricant.

It is preferred that the wavelength of the energy beams is 1,100 nm or less. When the wavelength is shorter, a fine magnetic pattern can easily be formed because the diffraction effect is small and the resolution is increased. More preferably, the wavelength is 600 nm or less. Such wavelength gives not only a high resolution but also a small diffraction, whereby the space between the mask and the magnetic recording medium can be widened, hence, handling is easy, and the construction of a magnetic pattern forming device is easy. Further, the wavelength is preferably 150 nm or more. When it is less than 150 nm, the absorption of heat by synthesized quartz used for the mask is large, and heating may be insufficient. When the wavelength is 350 nm or more, optical glass can be used for the mask.

As the energy beams, specifically, excimer laser (157, 193, 248, 308 and 351 nm), a second harmonic wave (532 nm), a third harmonic wave (355 nm) or a fourth harmonic wave (266 nm) of Q-switch laser (1,064 nm) of YAG, Ar laser (488 nm, 514 nm) or ruby laser (694 nm) may be mentioned.

Preferably, the energy beams are previously subjected to an intensity distribution equalizing treatment so that the distribution of heat in the irradiated area can be suppressed to be small and the distribution of the magnetic intensity of a magnetic pattern can be suppressed to be small. Accordingly, a magnetic pattern having a highly uniform signal intensity can be formed when the signal intensity is read by using a magnetic head.

The intensity distribution equalizing treatment may be such treatment as follows for example. A homogenizer or condenser lens is used for equalization or a shading plate or a slit is used to transmit only a small portion of the intensity distribution of the energy beams therethrough, and to expand it as the case requires.

In the present invention, energy beams are preferably irradiated through a mask to heat a local portion. The use of the mask allows to form on the medium a magnetic pattern of desired shape. Accordingly, a complicated pattern or a unique pattern which was difficult to form by the conventional techniques can easily be formed.

For example, in a phase shift servo system for a magnetic disk, a magnetic pattern which extends, from an inner periphery to an outer periphery, obliquely or linearly to the diameter or the tracks, is used. It was difficult to form a pattern continuous to the radial direction or a pattern oblique to the radial direction by the conventional techniques.

A complicated calculation or complicated device was needed in a method for recording servo signals for each track while the disk was rotated.

Further, in the technique described in U.S. Pat. No. 3,869,711, it was possible to form a magnetic pattern having an oblique angle with respect to a direction of track of a magnetic disk. However, this technique could form only a pattern having a weak signal intensity.

In a magnetic disk having a high coercive force of 2,000 to 2,500 Oe or more, it is indispensable to use permalloy or a soft magnetic material having a large saturated magnetic flux density such as sendust for a ferromagnetic material (for a shielding material) for a pattern of the master disk in order to assure a sufficient magnetic field intensity for printing. However, in the case of the oblique pattern, the magnetic field for reverse magnetization was oriented in a direction perpendicular to the gap generated by the ferromagnetic layer of the master disk, and it was impossible to incline the magnetization in a desired direction.

As a result, a part of the magnetic field escaped to the ferromagnetic layer and a sufficient magnetic field could not be applied to a desired portion for magnetic printing, whereby a sufficiently magnetically reversed pattern could not be formed and it was difficult to obtain signals having a high intensity. In such oblique magnetic pattern, the output of reproducing signals is reduced more than the azimuth loss, in comparison with a case of using a pattern perpendicular to the tracks.

According to the present invention, since it is unnecessary to shield the external magnetic field by a soft magnetic material of the master disk, such oblique magnetic pattern can be formed well. Further, the magnetic pattern can be formed easily in a short time by the irradiation of once time without requiring a complicated calculation or complicated device.

In the present invention, the mask is not always necessary to cover the whole surface area of the magnetic disk but may be of a size having a repetition unit for forming a magnetic pattern. Such mask can be used by successively moving it to complete a desired pattern. Therefore, the mask can be formed easily and economically.

The mask can be such one capable of changing the intensity distribution of energy beams so as to correspond to a magnetic pattern to be formed so that a gradation (intensity distribution) of energy beams is formed on the surface of the magnetic disk. As an example, there is a photomask having a transmissive portion for transmitting energy beams according to a pattern or a hologram mask in which a hologram for focusing a specified pattern on the medium is recorded. Since such mask permits forming a plurality of magnetic patterns or a pattern having a large surface area at a time, the magnetic pattern forming step can easily be performed in a short time. Although a clear sharp pattern can be formed with use of the hologram mask even when the mask is separated sufficiently from the medium, the photomask is advantageous from the viewpoint of easiness and cost in manufacturing.

Although material for the mask is not limited in the present invention, the mask made of a non-magnetic material permits the formation of a magnetic pattern of clear uniform shape and producing strong reproducing signals uniformly.

Use of a mask containing a ferromagnetic material is not desirable because the magnetic field distribution is disturbed by magnetization. In a pattern having a shape oblique to a radial direction of a magnetic disk or a shape oblique to a circular pattern extending in a radial direction of a magnetic disk, it is difficult to obtain signals of high quality from the nature of the ferromagnetic material because magnetic domains do not sufficiently oppose to each other in the magnetic transition area.

The mask is disposed between the light source for energy beams and the magnetic recording medium. When the accuracy of a magnetic pattern is considered dominantly, it is preferred to contact the entire portion or a portion of the mask to the medium whereby influence by the diffraction of laser light can be minimized and a magnetic pattern having a high resolution can be formed. For example, when the mask is placed on the medium in a stationary state, there are a portion which contacts the medium and a portion which does not contact the medium due to the undulation of several $\mu$m resulted in the medium surface. A pressure of 60 kPa or less should be applied to the mask and the medium so as not to cause a trace of impression or a damage in the medium. The pressure to the mask and the medium is preferably 9.8 kPa (100 g/cm$^2$) or less.

In order to form a finer magnetic pattern, there is a method for forming the magnetic pattern by bringing the mask into close contact with the medium without any space therebetween. Energy beams are diffracted largely as the distance of a space through which the energy beams pass is narrow. Accordingly, there is a large influence of diffraction when it is desired to form a magnetic pattern having a narrow line width, and the line width is apt to expand. Accordingly, when a magnetic pattern having a narrow line width is to be formed, it is preferable to bring intentionally the mask into contact with the medium in order to minimize influence by the diffraction of energy beams. By such measures, it is possible to write easily signals having information that the line width of a magnetic pattern is 0.5 $\mu$m or less.

According to this technique, it is possible to suppress the reduction of energy density due to the diffraction of energy beams whereby it is possible to form a magnetic pattern with a lower energy density. Namely, in a case of forming a magnetic pattern by providing a space between the mask and the medium, the irradiation area of energy beams on the medium is wider than the irradiation area of energy beams at the time of transmitting the mask due to the influence of the diffraction of energy beams. However, since the power of energy beams itself is constant between before and after the diffraction, the energy density on the medium decreases in consequence. On the other hand, in a case of forming a magnetic pattern by bringing the mask into contract with the disk, the spread of the irradiation area due to the diffraction of energy beams can be suppressed, and therefore, no reduction of the energy density takes place.

Further, since there is no space between the mask and the medium, the occurrence of pulses (sub-pulses) having an insufficient output of reproducing signal which is caused mainly by the interference of energy beams, can be suppressed to the minimum. When a space is resulted between the mask and the medium, there is a case of causing interference of energy beams so that an interference fringe is generated on the medium. Since there are a bright region and a dark region due to the interference of light in the interference fringe, the coercive force of the magnetic layer can not sufficiently be decreased in a dark region depending on a degree of interference fringe or the position formed, whereby a magnetic pattern of small output of reproducing signal is formed so that sub-pulses may generate.

Generally, the sub-pulses are evaluated with a rate of occurrence of sub-pulses. Here, the rate of occurrence of sub-pulses is expressed by the rate of occurrence of sub-pulses (%)=(TAA$_{20\%}$-TAA$_{50\%}$)/TAA$_{50\%}$×100 where TAA represents an average reproducing signal in the same pattern region, TAA$_{20\%}$ represents the number of signals having an output of 20% or more and TAA$_{50\%}$ represents the number of signals having an output of 50% or more of TAA. The value of the rate of occurrence of sub-pulses is about from 10 to 15% in average in a medium having a good magnetic pattern. It takes a value of 20% or more in a case of a magnetic pattern having a large scattering due to a large influence of interference.

When the lessening of a defect or a damage is considered significantly, it is preferable to form a space between the mask and the medium in at least an area for forming a magnetic pattern in the medium. The provision of the space can suppress the occurrence of a damage or a defect in the medium or the mask due to the invasion of dust or the like.

When a lubricant layer is formed before the formation of the magnetic pattern, the space is preferably be formed between the mask and the medium so as to minimize the contact of the lubricant to the mask. Further, if energy beams of high power are irradiated in a state that the mask is brought to contact with the lubricant layer on the disk, there may cause explosion due to rapid evaporation of the lubricant whereby the lubricant may scatter or the mask may be damaged.

When a magnetic pattern is formed in a state that the mask is brought into contact with the disk, the magnetic pattern may be formed in the disk before the formation of the lubricant layer. In this case, a fine magnetic pattern can be formed with high accuracy because there is no influence such as the scattering of lubricant, the deposition on the mask.

As a method for keeping the space between the mask and the magnetic pattern forming area of the magnetic recording medium, there is a method for keeping the both members at a predetermined distance. For example, a specified tool to keep the mask and the medium at a predetermined distance may be used. Further, a spacer may be inserted between them at a position other than the magnetic pattern forming area. Further, the spacer may be formed integrally with the mask.

When a spacer is provided between the mask and the magnetic recording medium in an outer peripheral portion and/or an inner peripheral portion of the magnetic pattern forming area of the medium, it can correct the undulation of the surface of the magnetic recording medium whereby accuracy in forming a magnetic pattern can be increased.

When a magnetic pattern is to be formed by bringing intentionally the mask into contact with the magnetic recording medium by applying a negative pressure between the mask and the magnetic recording medium, it is preferable to provide at least one boss-like spacer in an outer circumferential portion of the magnetic recording medium. The provision of such spacer in a circumferential portion of the medium or the mask permits the entering of air through the space provided by the boss-like spacer after the application of a negative pressure between the mask and the magnetic recording medium has been stopped, whereby it is possible to separate easily the mask from the magnetic recording medium.

It is further preferable to conduct an etching treatment to an outer circumferential portion of the mask to form fine grooves through which air enters. The provision of the boss-like spacer may lose close contactness between the mask and the magnetic recording medium because a space is resulted around the boss-like spacer. On the other hand, when the fine grooves are formed in the mask itself, no space is formed in other than the grooves, and therefore, the close contactness between the mask and the magnetic recording medium can be improved. The grooves may be formed in a light shielding portion other than the light transmitting portion as far as the grooves do not influence the magnetic pattern formed by irradiating energy beams.

The photomask may be a mask provided with a transmissive portion or portions and a non-transmissive portion or portions by which a desired magnetic pattern is formed. Such mask can be formed by sputtering metal such as Cr or the like on a transparent original plate such as quartz glass, soda lime glass or the like, coating a photoresist thereon and etching the photoresist, whereby a predetermined transmissive portion(s) and a non-transmission portion(s) can be formed. In this case, the portion(s) having a Cr layer on the original plate correspond to the non-transmissive portion(s) of energy beams, and portion(s) without the layer correspond to the transmissive portion(s).

The mask thus prepared has generally an uneven surface wherein projecting portions do not transmit energy beams. The projecting portions are brought closer to or substantially contact with the medium. Or, material for transmitting energy beams may be embedded in recesses portions after the formation of the mask so that the surface area in slight contact with the medium is made flat. Further, after the transparent original plate itself has been etched, metal such as Cr or the like is embedded in the etched portion so as to make the embedded portion to be the non-transmissive portion.

Material for the spacer should be hard. Further, it is preferable that the material for the spacer is not magnetized because the external magnetic field is used for forming the pattern. Metal such as stainless steel, copper or chromium, or resin such as polyimide is preferable. The height of the spacer is generally in a range of several $\mu$m to several hundreds $\mu$m although it is optional.

As described before, the photomask is provided with the transmissive portion(s) and the non-transmissive portion(s) by forming the non-transmissive layer to the energy beams on the transparent substrate. Although the transparent substrate may be any as far as it can transmit sufficiently energy beams, it is preferable to use a material containing quartz as the main component for the substrate. The quartz is relatively expensive. However, it has high light transmitting properties to energy beams of ultraviolet region. Accordingly, there is an advantage that energy beams of short wavelength such as 300 nm or less which allow easily fine processing, can be used. In a case that energy beams having a longer wavelength is used, optical glass is better in cost.

The thickness of the transparent substrate is not in particular limited, however, a thickness of from about 1 to 10 mm is generally preferable in order to obtain flatness in a stable manner without causing flexure in the substrate.

Further, it is preferable that the non-transmitting layer of the photomask is a multi-layer of a chromium layer and a chromium oxide layer. It is preferred to prepare the photomask with a non-transmissive layer by forming a chromium layer and a chromium oxide layer on a quartz glass substrate. Namely, since the reflectivity of quartz glass constituting the transmissive portion is about 5%, and on the other hand, the reflectivity of chromium is very high, it is preferable to cover the surface of the chromium layer with another layer having a low reflectivity. For example, the front surface of the non-transmissive portion is covered with chromium oxide having a reflectivity of about 16%. Energy beams reflected at the medium surface can be prevented from returning to the medium after the energy beams have been again reflected at the mask surface. Use of the chromium oxide layer is preferable because it has a low reflectivity and it can be formed merely by oxidizing chromium. Further, it has excellent contact properties to the chromium layer.

As an example of the method for producing the photomask, a chromium layer is first formed on a substrate such as quartz usable for the mask, and a chromium oxide layer is formed thereon. As the method for forming the chromium layer, there are a sputtering method, a vapor deposition method, a coating method and so on. The sputtering method is preferable from the viewpoint of capability of forming a compact layer. The same technique can be used for forming the chromium oxide layer. A layer forming method using oxygen for oxidizing chromium is preferably used.

Then, a photoresist is coated on the multi-layer of chromium and chromium oxide by a spin coating or the like, and light is exposed to the photoresist according to a predetermined pattern. After the exposure, etching is conducted to remove the chromium and the chromium oxide according to the pattern to form the non-transmissive layer. Thus, the photomask is obtainable.

The layer thickness of each layer of the non-transmissive layer comprising the multi-layer of chromium and chromium oxide can be such one capable of obtaining sufficient non-transmissive properties (light shielding properties of energy beams), a predetermined reflectivity and durability to the energy beams. Although the thickness varies depending on the compactness of the layer, i.e., a layer forming method, it is generally preferable to have a thickness of 40 nm or more. The thicker, the more preferable when the durability to energy beams is considered significantly. For example, the thickness is preferably 160 nm or more, more preferably, 200 nm or more. However, if the thickness is too large, the layer forming time becomes longer. Accordingly, a thickness of 500 nm or less is preferred. When the chromium layer and the chromium oxide layer are to be provided, it is preferable that the layer thickness of the chromium layer is 20 to 200 nm and the layer thickness of the chromium oxide layer is 20 to 200 nm.

In the photomask with the non-transmissive layer, the non-transmissive layer provides projecting portions. The photomask is generally disposed so that the surface on which the non-transmissive layer is formed faces a magnetic disk. Material for transmitting energy beams may be embedded in recesses portions between the non-transmissive layer so that the surface of the photomask is flat.

When a fluorine type lubricant is used as the lubricant for the magnetic recording medium, it is preferable to use material containing silicon as the main component, as the non-transmissive layer.

Use of the fluorine type lubricant may cause the decomposition of lubricant by the irradiation of energy beams and generate hydrofluoric acid. Since the hydrofluoric acid has a corrosive effect, the non-transmissive layer of the photomask may be corroded. However, since silicon is very chemically stable and has durability to hydrofluoric acid, corrosion by the hydrofluoric acid can be prevented. Further, since silicon has excellent contacting properties to glass used for the substrate of mask, there seldom occurs peeling.

The particularly preferable material is such one containing silicon in an amount of 90 atomic % or more. However, another element may be contained for another purpose such as making crystallization small. As the another element, at least one selected from the group consisting of hydrogen, oxygen, nitrogen, Cr, Mo, Al, Pt, Au, Ag, Cu, PD, Ti, Ni, Ta, Mg, Se Hf, Zr, V, Nb, Ru, W, Mn, Re, Fe, Co, Rh, Ir, Zn, Cd, Ga, In, Ge, Te, Pb, Po, Sn, Bi and B may be mentioned, for example. When the non-transmissive layer is formed by a sputtering method, sputtering gas such as Ar may be entrained in the layer.

In order to prevent effectively the corrosion by hydrofluoric acid, noble metal such as Pt, Au, Rh or the like, or oxygen, hydrogen or nitrogen is preferred as an element to be added. A single kind or more than two kinds of these elements can be used. The content is preferably 10 atomic % or less.

The method for forming the non-transmissive layer is not in particular limited but a method for forming by sputtering, electron beam deposition, thermal deposition, CVD or the like can be used. In particular, the sputtering method is preferable from the viewpoints of providing a dense layer, anti-peeling properties to thermal shock and quickness of forming the layer.

The non-transmissive layer may be a multiple layer of double layers or more as the case requires. Or another layer may be formed on the non-transmissive layer. For example, a layer composed of chromium oxide may be formed in order to reduce the reflectivity at the surface of the non-transmissive layer.

The thickness of the non-transmissive layer can be such one capable of obtaining sufficient non-transmitting properties (light shielding effect of energy beams), a predetermined reflectivity and the durability to energy beams. Although the thickness varies depending on the compactness of the layer, i.e., a layer forming method, a thickness of 30 nm or more is generally preferable. In consideration of the durability to energy beams to be significant, a thickness of 50 nm or more, more preferably, 70 nm or more is preferred in order to increase the thermal capacity. However, the thickness is too large, the transmissivity of energy beams decreases and the time for forming the layer is prolonged. Accordingly, it is preferable to be 500 nm or less, more preferably, 400 nm or less, especially preferably, 300 nm or less.

In the present invention, it is preferable to form a dielectric layer which is transparent to energy beams, as the outermost layer (at a side opposing the medium) of the non-transmissive portion. A purpose of providing the dielectric layer is to reduce the reflectivity of the shading portion at the medium side. If the reflectivity of this surface is high, light reflected from the medium is directed again to the medium whereby temperature at the portion just below the shading portion of the medium, which can not be used for recording, will increase, and signals for printing are disturbed.

As the dielectric layer used in the present invention, silicon oxide, aluminum oxide, titanium oxide or the like may be mentioned. However, silicon oxide is preferred from the viewpoints of durability to hydrofluoric acid and contacting properties to the glass substrate.

A silicon oxide layer produced by sputtering is in particular dense, and it has excellent durability to hydrofluoric acid in comparison with quartz glass for the substrate which belongs the same kind. Accordingly, it is preferable that a silicon oxide layer is formed by sputtering on the transmissive portion in the same manner as shading portion. With this, the corrosion resistance of quartz glass can be improved.

In a case of forming the dielectric layer on only the non-transmissive portion, it is possible to form the dielectric layer and a silicon-containing layer for light shading successively at the initial state of layer forming step to the substrate. In a case of providing the dielectric material on both the non-transmissive portion and the transmissive portion, a technique of sputtering silicon oxide on the entire surface followed by preparing a pattern of transmissive portion and non-transmissive portion, can be used.

In preparing the dielectric layer, a reactive sputtering of oxygen, nitrogen or the like should be done by using a metallic target, whereby the layer quality can be we controlled by adjusting the partial pressure of reactive gas and a layer-forming power. Accordingly, use of the reactive sputtering is preferred in order to obtain a sufficiently transparent layer, or from a viewpoint of a layer-forming speed. The thickness of the dielectric layer is preferably 20 nm or more. If the thickness is too large, the layer-forming time is long and there is an optical influence. Therefore, the thickness is preferably 300 nm or less.

However, it is unnecessary to form the dielectric layer as the outermost layer in an area other than the area corresponding to the magnetic pattern forming area even though it faces the magnetic recording medium.

The mask as explained above, can preferably be applied not only to the magnetic pattern forming method but also to the formation of a pattern for an optical recording medium, or a mask generally used for laser processing in semiconductor or liquid crystal manufacturing technique. In particular, it is suitable for the case of laser-processing to an object which may generate hydrofluoric acid.

There is a case that a magnetic recording medium has both main surfaces on which magnetic layers are formed. In this case, the formation of a magnetic pattern according to the present invention may be conducted for each surface successively or for both surfaces simultaneously by arranging masks, energy irradiation systems and means for applying an external magnetic field at both sides of the medium.

In a case that two or more magnetic layers are formed on a surface and when each different pattern is to be formed in each magnetic layer, irradiated energy beams should be focused to each layer to heat separately whereby individual patterns can be formed.

In forming a magnetic pattern, it is preferable to form a structure for preventing re-irradiation of energy beams by disposing a shading plate capable of blocking selectively energy beams in an area where irradiation is undesirable, between the energy beam source and the mask, or between the mask and the medium.

As the shading plate, such one capable of blocking a specified wavelength of usable energy beams, or reflecting or absorbing the energy beams, is preferably used. However, there is a material which generates heat by the absorption of energy beams whereby a magnetic pattern is influenced. Accordingly, a material having good thermal conductivity and high reflectivity such as Cr, Al or Fe is preferred for the shading plate.

Further, a reduction projection technology is preferably used for the optical system. An image is focused on the medium surface by reducing patterned energy beams having the intensity distribution corresponding to a magnetic pattern to be formed. According to this technique, the accuracy of the magnetic pattern, which depends on the accuracy of patterning or alignment of the mask, is not restricted in comparison with a case that energy beams are throttled by an objective lens and then, the throttled beams are passed through the mask, i.e., a case of proximity exposure of light. Accordingly, a finer magnetic pattern can be formed with good accuracy. Further, there is little possibility of being influenced by dust because the mask is apart from the medium. Hereinbelow, this technique may be referred to as a reduction projection technology (an imaging optical system).

When the energy beams emitted from the light source are passed through the mask, the intensity distribution of the energy beams is changed and a reduced image is formed on the medium surface through an imaging means such as an image lens. The image lens may be referred to as a projection lens, and the reduced image may be referred to as a reduced projection.

Next, the structure of the magnetic recording medium suitable for the present invention will be described.

The substrate for the magnetic recording medium of the present invention should not cause vibrations even when the medium is rotated at a high speed during recording or reproducing at a high speed, and therefore, a hard substrate is usually used. In order to obtain a sufficient rigidity to vibrations, the thickness of the substrate is preferably 0.3 mm or more. However, a thicker substrate is contrary to a demand of reducing the thickness of magnetic recording devices. Accordingly, 3 mm or less is preferable. For example, an Al alloy substrate containing Al as the main component, such as an Al—Mg alloy substrate, a Mg alloy substrate containing Mg as the main component, such as a Mg—Zn alloy substrate, a substrate composed of material such as usual soda glass, aluminosilicate glass, non-crystalline glass, silicon, titanium, ceramics or various kinds of resin or a substrate prepared by combining such materials, may be used. In particular, it is preferred to use the Al alloy substrate, a substrate made of glass such as crystallized glass from the viewpoint of strength, or a substrate made of resin from the viewpoint of cost. When a substrate made of glass is used, the expansion of a heated area due to the irradiation of energy beams can be suppressed because glass has a smaller thermal conductance, whereby a finer magnetic pattern can be formed.

Further, when a substrate having a high hardness is used, the occurrence of a defect, e.g., a flaw or a recess, in the magnetic recording medium can be suppressed even when dust or the like deposits between the mask and the medium. Accordingly, when a magnetic pattern is to be formed in a state that the mask is brought into contact with the magnetic recording medium, it is preferred to use a magnetic recording medium comprising a substrate having a high hardness.

The present invention provides a remarkable effect when applied to a medium having a hard substrate. In the conventional magnetic printing method, the medium having a hard substrate had problems that the contact of the medium to a master disk was insufficient to cause a flaw or a defect, or the boundary of printed magnetic domains is unclear and PW50 may expand. On the other hand, the present invention does not create such problem because the mask is not brought to press-contact with the medium. In particular, the present invention is effectively used for a medium with glass substrate in which cracks are apt to cause.

In manufacturing steps for magnetic recording media, washing and drying are generally carried out in order to assure adhesiveness of each layer.

In manufacturing a magnetic recording medium according to the present invention, a metallic layer such as NiP, NiAi or the like may be formed on the substrate surface.

As the method for forming the metallic layer, a technique for forming a thin film such as an electroless plating method, a sputtering method, a vacuum deposition method, a CVD method and so on may be used. When a substrate made of a conductive material is used, electrolytic plating may be used. The thickness of the metallic layer is preferably 50 nm or more. However, in consideration of productivity for a magnetic recording medium, the thickness is preferably 20 $\mu$m or less, more preferably, 10 $\mu$m or less.

Further, it is desirable to form the metallic layer on the entire substrate surface. However, it is possible to form it only a part, for example, only an area where texturing is conducted.

The texturing may be conducted concentrically on the substrate surface or on a substrate surface where the metallic layer is formed. In the present invention, "concentrically texturing" indicates a state that a large number of fine grooves are formed in a circumferential direction of the substrate by grinding the substrate in the circumferential direction by employing, for example, mechanical texturing with use of abrasive grain and a texture tape together, texturing utilizing laser beams, or by the combination of these techniques.

The mechanical texturing is generally conducted to provide anisotropy in the magnetic layer in its longitudinal direction. Accordingly, it is unnecessary to conduct it when isotropy is provided in a magnetic layer in its longitudinal direction.

Further, the texturing utilizing laser beams is generally conducted to improve CSS (contact-start-and-stop) characteristics. It is unnecessary to conduct such texturing in a system that a magnetic recording device has a head which is moved out of the magnetic recording medium in a non-driving time (a load/unload system).

As the abrasive grain used for the mechanical texturing, an alumina grain is widely used. However, a diamond grain exhibits excellent performance from the viewpoint that a longitudinally orientated medium has its nature to provide the easy magnetization axis along texturing grooves. In particular, grain having graphatized surface is most preferable.

In order to realize high density magnetic recording, it is effective to reduce the flying height of the head as possible. Further, as a characteristic feature of the substrate, it should have an excellent smoothness or flatness. Accordingly, the surface roughness Ra of the substrate surface is preferably 2 nm or less, more preferably, 1 nm or less, particularly preferably, 0.5 nm or less. The surface roughness Ra is a value obtained by measuring a length of 400 $\mu$m with a contact finger type surface roughness meter and calculating the measured value according to JIS B0601. In this case, the end of the probe for measuring is of a size of about 0.2 $\mu$m in radius.

An underlayer may be formed between the magnetic layer and the substrate. The underlayer is to make the crystal fine and to control the orientation of the crystal face. For this purpose, material containing Cr as the main component is preferably used.

Other than pure Cr, the material for the underlayer containing Cr as the main component may be used. Such material contains an alloy composed of at least one element selected from the group consisting of V, Ti, Mo, Zr, Hf, Ta, W, Ge, Nb, Si, Cu and B or chromium oxide in order to obtain good crystal matching to the recording layer.

In particular, pure Cr or an alloy obtained by adding to Cr one or more elements selected from the group consisting of Ti, Mo, W, V, Ta, Si, Nb, Zr and Hf, is preferable. The contents of the second and third elements are preferably from 1 atomic % to 50 atomic %, more preferably from 5 atomic % to 30 atomic %, further preferably, 5 atomic % to 20 atomic %, although the optimum amounts vary depending on elements used.

The thickness of the underlayer should be sufficient to obtain the anisotropy, and is preferably 0.1 to 50 nm, more preferably, 0.3 to 30 nm, further preferably, 0.5 to 10 nm. When the underlayer containing Cr as the main component is formed, the substrate may be or may not be heated in the formation of the underlayer.

A soft magnetic layer may be formed between the underlayer and the recording layer as the case requires. The formation of the soft magnetic layer provides a large effect and is used preferably for, in particular, a keeper medium which reduces magnetic transition noises or a perpendicular recording medium wherein magnetic domains extend perpendicular to the longitudinal direction of the medium.

The soft magnetic layer should be made of material having relatively high permeability and small magnetic loss. NiFe or an alloy obtained by adding Mo or the like as the third element to NiFe is used preferably. The optimum permeability, which varies largely depending on the characteristics of the head and the recording layer used for recording data, is preferably from about 10 to 1,000,000 (H/m) as the maximum permeability.

Further, an interlayer may be formed on the underlayer containing Cr as the main component as the case requires. For example, when a CoCr series interlayer is formed, it is easy to control crystallization of the magnetic layer.

In forming the recording layer (magnetic layer), a layer having the same material as the underlayer or another non-magnetic material may be interposed between the recording layer and soft magnetic layer. When the recording layer is formed, the substrate may be or may not be heated. As the recording layer, a Co alloy magnetic layer, a rare earth type magnetic layer represented by FbFeCo or a multi-layer of a transition metal and a noble metal represented by a multi-layer of Co and Pd is preferably used.

As the magnetic layer of Co alloy, pure Co or a magnetic material of Co alloy which is generally used as a magnetic material, such as CoNi, CoSm, CoCrTa, CoNiCr or CoCrPt can be used. Further, an element such as Ni, Cr, Pt, Ta, W, B or the like or a compound such as $SiO_2$ may be added to the Co alloy. For example, CoCrPtTa, CoCrPtB, CoNiPt, CoNiCrPtB or the like may be mentioned. The thickness of the magnetic layer of Co alloy is preferably, 5 nm or more, more preferably, 10 nm or more, although the thickness is optional. Further, the thickness is preferably 50 nm or less, more preferably, 30 nm or less. The recording layer may be formed by laminating two or more number of layers by interposing an appropriate non-magnetic interlayer or without any interposing layer. In this case, the composition of the magnetic material to be formed may be the same or different.

As a magnetic material for a rare earth type magnetic layer, a generally used material such as TbFeCo, GdFeCo, DyFeCo, TbFe or the like may be mentioned. Tb, Dy or Ho or the like may be added to such rare earth alloy. Ti, Al or Pt may be added to prevent the deterioration by oxidation. Although the thickness of the rare earth type magnetic layer is optional, a thickness of from about 5 to 100 nm is usually used. Further, two or more layers may be formed as the recording layer directly or by interposing an appropriate non-magnetic interlayer. The composition of the magnetic material to be laminated may be the same or different. In particular, the rare earth type magnetic layer is a layer having an amorphous structure and is capable of magnetizing vertically to a longitudinal direction of the medium. Accordingly, the method according to the present invention is suitable for high density recording and is capable of forming a magnetic pattern with high density and high accuracy is effectively applicable.

The multi-layer of transition metal and noble metal, which is capable of perpendicular magnetic recording as well, may be of generally used one, for example, Co/Pd, Co/Pt, Fe/Pt, Fe/Au, Fe/Ag or the like. The transition metal and the noble metal for the material of multi-layer are not always necessary to be pure but may be an alloy containing such metal as the main component. The thickness of the multi-layer is usually from about 5 to 1,000 nm although it is optional. Further, the multi-layer may be composed of three or more kinds of material as the case requires.

In the present invention, the recording layer is preferably thin. If the recording layer is thick, thermal conduction in a thickness direction in heating the recording layer is poor, and excellent magnetization may not be obtained. Therefore, the thickness of the recording layer is preferably 200 nm or less. On the other hand, the thickness of the recording layer is preferably 5 nm or more in order to keep magnetization.

In the present invention, the magnetic layer as the recording layer keeps magnetization at room temperature, and is demagnetized or magnetized in the opposite direction by applying heat and an external magnetic field.

The magnetic layer should keep magnetization at room temperature, and it is preferable that the static coercive force of the magnetic layer be 2,000 Oe or more at room temperature, whereby a medium having small magnetic domains and suitable for high density recording is obtainable. More preferably, the static coercive force at room temperature is 3,000 Oe or more. On the other hand, the static coercive force at room temperature should be 20 kOe or less. If it exceeds 20 kOe, a large magnetic intensity is needed in order to obtain uniform magnetization by the first external magnetic field, and there may cause difficulty in performing usual magnetic recording. The static coercive force is preferably 15 kOe or less, more preferably, 15 kOe.

Description will be made as to the static coercive force of the magnetic layer, heating temperature to a local portion and the intensity of the second external magnetic field. For example, in a medium having a static coercive force of 3,500 to 4,000 Oe at room temperature, the coercive force is usually decreases linearly at a rate of 10 to 15 Oe/° C. with temperature rise. For example, it decreases to about 2,000 Oe at 150° C. Since it is easy to generate a coercive force of about 3,000 Oe by using an external magnetic field applying means, it is possible to form sufficiently a magnetic pattern even by a heating temperature of about 150° C.

The dynamic coercive force should generally be large in order to maintain stably information recorded with high density. The dynamic coercive force is a coercive force obtained by measuring when the magnetic field intensity is changed in a short time of 1 sec or less, i.e., a coercive force of a magnetic field having a pulse width of 1 sec or less. However, the value varies depending on the magnitude of a magnetic field and a heat application time. Preferably, the dynamic coercive force under the condition of 1 sec is twice or more than the static coercive force. However, if it is excessively large, a large magnetic field intensity is needed for magnetization by the second external magnetic field. Therefore, 20 kOe or less is preferable.

In the following, an example of the sequence of measuring the dynamic coercive force (the coercive force of the magnetic layer as the recording layer) of a magnetic recording medium is shown.

1. The coercive force of the medium under the condition of application time t=10 sec is obtained.
   1.1 A magnetic filed of maximum magnetic field intensity (20 kOe) is applied to the medium to saturate it.
   1.2 A magnetic field H1 having a predetermined intensity is applied in a negative direction (a direction opposite to the direction of saturation).
   1.3 10 sec is maintained under this magnetic field condition.
   1.4 The magnetic field is returned to zero.
   1.5 The value of magnetization at the moment of the above 1.4 is read to obtain a residual magnetization value M1.
   1.6 The same steps (1.1 to 1.5) of measurement are repeated by changing a little the intensity of the magnetic field applied in the above 1.2. As a result, residual magnetization values M1, M2, M3 and M4 are obtained with respect to the intensities of magnetic field H1, H2, H3 and H4 at 4 points in total.
   1.7 From the values at these 4 points, the applicable magnetic field intensity H which provides residual magnetization value M=0 is obtained. This corresponds to the coercive force of the medium under the condition of application time t=10 sec.

2. The application time t is changed to 60 sec, 100 sec and 600 sec, and measurement is conducted in the same manner to obtain each coercive force at each application time.

3. In the estimation of the coercive force values at 10 sec, 60 sec, 100 sec and 600 sec, a coercive force at a shorter application time can be obtained.

For example, the dynamic coercive force under the condition of application time=1 nsec can be obtained.

It is necessary for the magnetic layer to keep magnetization at room temperature and to be magnetized with a weaker external magnetic field at an appropriate heating temperature. Further, magnetic domains in a magnetic pattern can be made clear by increasing the difference between the room temperature and a magnetization erasing temperature. For this, it is preferable that the magnetization erasing temperature is higher. Specifically, it is preferred to be 100° C. or higher, more preferably, 150° C. or higher. For example, the magnetization erasing temperature exists in the vicinity of Curie temperature (slightly lower than Curie temperature) or in the vicinity of compensation temperature.

The Curie temperature is preferably 100° C. or higher. When it is lower than 100° C., the stability of the magnetic domains at room temperature tends to be low. More preferably, the temperature is 150° C. or higher. On the other hand, the temperature is preferably 700° C. or lower because when the magnetic layer is heated excessively, it may be deformed.

In the present invention, the Curie temperature of an AFC (Anti-Ferromagnetic coupled) medium does not mean Curie temperature of the principle magnetic layer but means apparent Curie temperature of the medium in its entirety.

When the magnetic recording medium is a longitudinal magnetic recording medium, it is difficult to conduct saturation recording to the magnetic recording medium for high recording density having a high coercive force by the conventional magnetic printing method. Further, it is difficult to form a magnetic pattern having high magnetic field intensity, and the full width at half maximum may expand. According to the present invention, a desired magnetic pattern can be formed even in a longitudinal recording medium suitable for high density recording. In particular, when the saturation magnetization of the magnetic layer is 50 emu/cc or more, the influence of a diamagnetic field is large. Accordingly, the application of the present invention provides a large effect.

A higher effect is obtainable when the saturation magnetization is 100 emu/cc or more. However, when the saturation magnetization is excessively large, the formation of the magnetic pattern is difficult. Therefore, it should be 500 emu/cc or less.

When the magnetic recording medium is a perpendicular magnetic recording medium wherein a magnetic pattern is relatively large and a unit volume of a magnetic domain is large, the saturation magnetization tends to be large and reverse magnetization is apt to occur due to demagnetization effect. This creates noises and deteriorates the full width at half maximum. However, the present invention makes it possible to record preferably in such medium by using the combination of the soft magnetic layer and the underlayer.

In the present invention, the protective layer is preferably formed on the magnetic layer. Namely, the outermost surface of the medium is covered with a hard protective layer by which a damage to the magnetic layer due to the collision of the magnetic head or the deposition of dust on the layer opposing to the mask is avoidable. When the magnetic pattern forming method using the mask is used according to the present invention, the protective layer protects the medium from the damage due to the contact by the mask.

Further, the protective layer in the present invention prevents the oxidation of the magnetic layer when it is heated. The magnetic layer is generally easily oxidized, and the oxidation is accelerated by heating. In the present invention, since the magnetic layer is locally heated by energy beams, it is desirable that the protective layer is previously formed on the magnetic layer in order to prevent the oxidation.

When the magnetic layer is constituted by a plurality of layers, the protective layer should be formed on the magnetic layer nearest to the outermost surface. The protective layer may be formed directly on the magnetic layer, or may be formed by interposing a layer having another function as the case requires.

A part of energy beams is absorbed by the protective layer whereby the magnetic layer is heated locally by thermal conduction. When the protective layer is too thick, a magnetic pattern may become unclear by the thermal conduction in a lateral direction. Accordingly, the thickness should be thin. Further, it is preferred to make the thickness thin for the purpose of reducing the distance between the magnetic layer and the magnetic head at a recording/reproducing time. Accordingly, the thickness is preferably 50 nm or less, more preferably, 30 nm or less, further preferably, 20 nm or less. On the other hand, in order to obtain sufficient durability, the thickness is preferably 0.1 nm or more, more preferably, 1 nm or more.

The protective layer should be hard and durable to oxidation. Generally, as the protective layer, a carbonic material such as carbon, hydrogenated carbon, nitrided carbon, amorphous carbon, SiC or the like, or $SiO_2$, $Zr_2O_3$, SiN, TiN or the like may be used. Further, the protective layer may be made of material having magnetic properties.

In particular, the protective layer should be thin and very hard in order to bring the distance between the head and the magnetic layer close as possible. Accordingly, use of a protective layer of carbonic material, in particular, diamond-like carbon is preferable from the viewpoint of its having impact resistance and lubricating properties. It serves not only to prevent a damage to the magnetic layer by the irradiation of energy beams but also to be durable to a damage of the magnetic layer by the contact of the head. The magnetic pattern forming method of the present invention is applicable to an opaque protective layer such as a carbonaceous protective layer.

Further, the protective layer may be formed of two or more layers. When a layer containing Cr as the main component is formed as the protective layer directly on the magnetic layer, it exhibits a remarkable effect to prevent oxygen permeating into the magnetic layer.

Further, it is preferred to form a lubricant layer on the protective layer in order to prevent a damage to the medium by the contact of the mask or the magnetic head. As lubricant used for the lubricant layer, a fluorine type lubricant, a hydrocarbon type lubricant and a mixture of these materials are mentioned. The lubricant can be applied by the usual method such as a dipping method, a spin coat method or the like. Or, the lubricant layer may be formed by a vapor deposition method. The thickness of the lubricant layer is preferably thin so as not to hinder the formation of the magnetic pattern, and is preferably 10 nm or less, more preferably, 4 nm or less. On the other hand, in order to obtain a sufficient lubricating performance, the thickness is preferably 0.5 nm or more, more preferably, 1 nm or more.

When energy beams are irradiated through the lubricant layer, lubricant may be applied again by taking account of a damage (decomposition or polymerization) of the lubricant.

In the layer structure as describe above, another layer may be formed as the case requires.

It is preferable to keep the surface roughness Ra of the medium after the formation of the magnetic pattern to 3 nm or less so as not to lower the stability of moving the flying/contact head. The surface roughens Ra of the medium means the roughens of the surface of the medium without having the lubricant layer and is a value obtained by measuring a length of 400 μm using a contact finger type surface roughens meter (model name: Tencor P-12 disk profiler (manufactured by KLA Tencor)) and calculating according to JIS B0601. The surface roughness Ra is, more preferably, 1.5 nm or less.

Desirably, the surface undulation Wa of the medium after the formation of the magnetic pattern is kept to 5 nm or less. Wa is an amount of undulation in the medium surface without having the lubricant layer, and is a value obtained by measuring a length of 2 mm using the contact finger type surface roughness meter (model name: Tencor P-12 disk profiler (manufactured by KLA Tencor) and calculating in the same manner as the calculation of Ra. More preferably, the surface undulation is 3 nm or less.

In the magnetic recording medium constructed as mentioned above, the formation of a magnetic pattern is conducted to the recording layer (magnetic layer). Although it is preferable to use either method as described before after the protective layer and/or the lubricant layer has been formed on the recording layer, a magnetic pattern may be formed just after the formation of the recording layer when there is no danger of the oxidation of the recording layer.

Various methods can be used as the layer forming method for forming each layer of the magnetic recording medium. For example, physically vapor-depositing methods such as a DC (magnetron) sputtering method, a high-frequency (magnetron) sputtering method, an ECR sputtering method, a vacuum deposition method and so on may be mentioned.

As layer forming conditions, an ultimate vacuum degree, a method for heating the substrate, a substrate temperature, a sputtering gas pressure, a bias voltage and so on are appropriately determined depending on the characteristics of the medium to be obtained. For example, in a sputtering method for forming a layer, an ultimate vacuum degree of $5 \times 10^{-6}$ Torr or less, a substrate temperature of from room temperature to 400° C., a sputtering gas pressure of from $1 \times 10^{-3}$ to $20 \times 10^{-3}$ Torr and a bias voltage of from 0 to −500V are generally preferable.

When the substrate is heated, it may be heated before the formation of the underlayer. When a transparent substrate having a low thermal absorptivity is used, an underlayer having a seed layer containing Cr as the main component or a B2 crystal structure is formed on the substrate to increase the thermal absorptivity; the substrate is heated, and then, the recording layer and so on are formed.

When the recording layer is a rare earth type magnetic layer, it is preferred to prevent corrosion and oxidation to the layer by the following methods. Namely, a mask is applied to the innermost circumferential portion and the outermost circumferential portion of a disk-like magnetic recording medium, layer formation is conducted to the step of forming the recording layer, the mask is removed before the successive step of forming the protective layer, and the recording layer is covered entirely with the protective layer. When the protective layer comprises double layers, steps until the formation of the recording layer and the first protective layer are conducted by using a mask, the mask is removed before the second protective layer is to be formed, and the recording layer is covered entirely with the second protective layer. In this case, the corrosion and the oxidation of the rare earth type magnetic layer can be preferably prevented.

Next, the magnetic recording device according to the present invention will be described.

The magnetic recording device of the present invention comprises a magnetic recording medium in which a magnetic pattern is formed according to the above-mentioned method, a driving portion for driving the magnetic recording medium in a recording direction, a magnetic head having a recording portion and a reproducing portion, means for moving relatively the magnetic head with respect to the magnetic recording medium, and a recording/reproducing signal processing means which supplies a recording signal to the magnetic head and receives a reproducing signal from the magnetic head. As the magnetic head, a flying/contact magnetic head is generally used to perform high density recording.

By using the magnetic recording medium in which a magnetic pattern such as a fine, highly accurate servo pattern providing a high output of reproducing signal, minimizing noises, providing high S/N and C/N as well as a small modulation is formed according to the method of the present invention, high density recording is possible. Further, use of the medium of flaw-free and less defect lessons errors in recording.

Precise servo signals can easily be obtained by using the magnetic recording device in which after the magnetic recording medium has been assembled in the device, the above-mentioned magnetic pattern is reproduced by the magnetic head to obtain signals, and the final servo burst signals generated based on such signals are recorded by the magnetic head.

Further, it is preferable that signals recorded as the magnetic pattern formed by the present invention remain in an area which is not used as a user's data area, after the servo burst signals have been recorded by the magnetic head. In this case, the magnetic head can easily be moved to a desired position even when a positional deviation of the magnetic head takes place due to any disturbance. Accordingly, such magnetic recording device capable of holding signals produced by the both recording methods is highly reliable.

A magnetic disk device as a typical example of the magnetic recording device will be described.

The magnetic disk device comprises generally a shaft for holding a single or a plurality of magnetic disks by penetrating it or them, a motor for rotating the magnetic disk or disks connected to the shaft by interposing a bearing or bearings, a magnetic head for recording and/or reproducing data, an arm attached with the head and an actuator for moving the head via the head arm to a desired position on the magnetic recording medium, wherein the recording/reproducing head is moved above the magnetic recording medium at a constant flying height. Data or information is recorded by the magnetic head after it has been converted into recording signals via a signal processing means. Further, reproducing signals taken by the magnetic head are converted inversely by the signal processing means whereby a reproduced information can be obtained.

Information signals are recorded for each sector of the disk along tracks formed concentrically. The servo pattern is usually recorded between sectors. The magnetic head takes the servo signals from the servo pattern whereby the head performs correctly tracking to the center of a track to read the information signals in the sectors. In the recording, the tracking is performed as well.

As described above, since the servo pattern which produces servo signals is used for the tracking in recording information, high accuracy is in particular required. Further, since a servo pattern which is widely used at present is comprised of two sets of patterns for each track wherein the patterns are shifted mutually by ½ pitch, it is necessary to form the servo pattern for each ½ pitch of information signals, and accordingly, double-precision is required.

However, in the conventional servo pattern forming method, the track width for writing of from about 0.2 to 0.3 μm was considered to be limit because of vibrations resulted in the magnetic recording device in which the center of gravity of the outer pin was different from that of the actuator. Accordingly, the accuracy of the servo pattern could not follow the demand of increasing track density. Therefore, it was difficult to improve recording density of the magnetic recording device and to reduce cost.

According to the present invention, however, a magnetic pattern of high output of reproducing signals, low noises, high S/N and C/N and small modulation can effectively be formed. Accordingly, the servo pattern can be formed accurately at a very low cost in a short time in comparison with the conventional servo pattern forming method. For example, the track density of the medium can be increased to 40 kTPI or more. Accordingly, the magnetic recording device using the medium of the present invention can perform high density recording.

Further, when a phase shift servo system is used, continuously changing servo signals can be obtained whereby the track density can be increased. Since the tracking under the condition of a width of 0.1 µm or less is possible, high density recording is obtainable.

As described before, in the phase shift servo system, a magnetic pattern extending, for example, linearly in an oblique direction with respect to the radial direction of the disk from its inner periphery to an outer periphery is used. A pattern continuous to the radial direction or a pattern oblique to the radius was difficult to form by the conventional servo pattern forming method for recording servo signals for each track while the disk was rotated, and complicated calculation or system was needed.

According to the present invention, however, since it is enough to prepare once a mask corresponding to the shape, and to irradiate energy beams to the mask, the pattern can easily be formed. Accordingly, the medium usable for the phase shift servo system can easily and economically produced in a short time. Further, a magnetic recording device of phase shift servo system which permits high density recording can be provided.

In the widely used conventional servo pattern forming method, a medium is assembled in a magnetic recording device (drive), and then, a servo pattern is formed with a servo writer for exclusive use in a clean room. Then, each drive is attached to the servo writer. The pin of the servo writer is inserted into the opening formed in either a front surface or a rear surface of the drive, and recording is conducted for each pattern along the track while the magnetic head is moved mechanically. Accordingly, it takes much time as about 15 to 20 min per drive. Since the servo writer of exclusive use and the opening is formed in the drive, these operations have to be conducted in a clean room, and the processes were complicated and manufacturing cost increased.

In the present invention, the servo pattern or the standard pattern for recording the servo pattern can be recorded in a lump by irradiating energy beams through the mask in which the pattern is previously formed. Accordingly, the servo pattern can be formed in the medium in a short time by a very simple manner. Thus, in the magnetic recording device with the medium in which the servo pattern is formed, the above-mentioned servo pattern writing step is unnecessary. Or in the magnetic recording device with the medium in which the standard pattern for recording a servo pattern is formed, a desired servo pattern can be written based on the standard pattern in the device. Thus, the above-mentioned servo writer is unnecessary, and work in the clean room is also unnecessary. Further, it is unnecessary to form the opening at rear side of the magnetic recording device, and therefore, it is preferable from the viewpoint of durability and safety.

Further, since the mask is not brought to contact with the medium, a damage of the magnetic recording medium by the contact with another structural member or a damage of the medium due to the interposition of fine dust or foreign matter can be prevented to thereby prevent occurrence of a defect.

As described above, according to the present invention, the magnetic recording device capable of recording with high density is obtainable by a simple way at a low cost.

Various kinds of magnetic head such as a thin film head, MR head, GMR head, TMR head and so on may be used. By constituting the reproducing portion of the magnetic head by the MR head, a sufficient intensity of signal can be obtained even in high density recording, and a magnetic recording device of high recording density can be realized.

When the magnetic head is moved at a flying height of not less than 0.001 µm but not more than 0.05 µm, the output of signal is improved, and the device having a high S/N can be obtained. Then, a magnetic recording device of large capacity and being highly reliable can be provided.

Further, when a signal processing circuit according to a maximum likelihood record method is combined, the recording density can further be improved. For example, a sufficient S/N can be obtained even when recording or reproducing is performed with a track density of 13 kTPI or more, a linear recording density of 250 kFCI or more and a recording density of 3 G bits ore more per square inch.

Further, the intensity of signals can further be increased by constituting the reproducing portion of the magnetic head by a plurality of conductive magnetic layers which cause a large change of resistance due to a relative change of mutual magnetization directions by the application of an external magnetic field and a GMR head comprising a conductive non-magnetic layer or layers disposed between the plurality of conductive magnetic layers or a GMR head utilizing a spin-valve effect. With use of such magnetic head, a highly desirable magnetic recording device having a recording density of 10 G bits or more per square inch and a linear recording density of 350 kFCI or more can be realized.

The entire disclosure of Japanese Patent Applications No. 2001-238698 filed on Aug. 7, 2001, No. 2001-326407 filed on Oct. 24, 2001, No. 2001-344618 filed on Nov. 9, 2001 and No. 2002-099124 filed on Apr. 1, 2002 including specification, claims, drawing and summary are incorporated herein by reference in its entirety.

EXAMPLES

Now, the present invention will be described in further detail with reference to Examples. However, it should be understood that the present invention is by no means restricted to such specific Examples.

Example 1

A NiP-plated aluminum alloy substrate having a diameter of 3.5 inches was washed and dried, and 60 nm of NiAl, 10 nm of $Cr_{90}Mo_{10}$, 12 nm of $CO_{64}Cr_{16}Pt_{12}B_8$ as a recording layer and 5 nm of carbon (diamond-like carbon) as a protective layer were formed thereon under such conditions that ultimate vacuum degree: $1\times10^{-7}$ Torr, substrate temperature: 350° C., bias voltage: −200V, sputtering gas: Ar and gas pressure: $3\times10^{-3}$ Torr.

As a lubricant layer, a fluorine type lubricant was coated in a thickness of 0.5 nm and baked at 100° C. for 40 minutes to obtain a longitudinal magnetic recording disk having a static coercive force of 3,600 Oe and a saturated magnetization of 310 emu/cc at room temperature.

The disk surface was uniformly magnetized by applying a magnetic field with an intensity of about 10 kOe (about 10 k Gauss) to this disk so that the direction of magnetic field by a permanent magnet would be the same as the direction of rotating the disk.

A substrate of quartz glass having a square shape of 127 mm×127 mm and a thickness of 2.3 mm was used for a photomask. 75 nm of chromium and 25 mm of chromium oxide were successively formed on the surface of the substrate facing the disk, and an area for etching (a pattern area) was etched to form a non-transmissive portion having the minimum width of pattern of 0.8 μm (0.8 μm for a line portion and a space portion). An area other than the area for etching (pattern area) is a non-transmissive portion comprising the chromium layer and the chromium oxide layer. The reflectivity of the thus obtained photomask to excimer pulse layer having a wavelength of 248 nm was 16% at the non-transmissive portion and 5% at the transmissive portion.

Then, a non-photosensitive polyimide resin was coated uniformly in a thickness of 2.5 μm on the photomask, and a photoresist was coated thereon in a thickness of 0.2 μm. Then, light from a high pressure mercury lamp was irradiated for broad band exposure through a mask for forming projections. Then, development with alkaline liquid and etching were conducted, and the remaining photoresist was removed to form projections. Then, the photomask was baked at 350° C. for 15 minutes to cure projections of polyimide resin.

The mask for forming projections was in a disk-like form having a diameter of about 3.5 inch wherein non-circular transmissive portions having a diameter of 50 μm were arranged at intervals of 100 μm in an area of 47 to 48 mm in radius. Thus, there was obtainable the photomask wherein the pattern area was formed in an area of 18 to 45 mm in radius, and substantially circular projections (spacers) having a height of 2.5 μm and a diameter of 50 μm were arranged at intervals of 100 μm in a circumferential portion of the pattern area, i.e., in the range of 47 to 48 mm in radius which was an outer periphery other than the pattern area.

The photomask was rotated integrally with the magnetic disk at a speed of 3.2 sec per revolution. Then, the printing of magnetic pattern was conducted under the following conditions. An excimer pulse laser having a wavelength of 248 nm was controlled to have a pulse width of 25 nsec, a power (energy density) of 160 mJ/cm$^2$, and a beam shape of 10 mm×30 mm (a diameter corresponding to 1/e$^2$ of the peak energy); a shading plate for forming the beam shape into a sectorial shape having an angle of 12° was disposed at the laser irradiation port, and pulsed laser was irradiated with 32 pulses at a repetitive frequency of 10 Hz (irradiation period: 100 msec), and at the same time, a magnetic field was applied with the magnetic field applying means shown in FIG. 3. In obtaining the heating temperature by simulation, it was found that the temperature was from about 170° C. to 200° C.

Namely, it was found that a magnetic field of about 1.7 k Gauss in an inner circumference region (a location of a radius of 21 mm) of the disk and about 1.9 k Gauss in an outer circumferential region (a location of a radius of 46.5 mm) was always applied in a circumferential direction of the magnetic disk, and a direction opposite to the uniform magnetization by the presence of the permanent magnets 22a to 22d.

Further, by supplying a pulse-like current of 700V to the air-core coils 28a, 28b, a pulse-like magnetic field of about 1.7 k Gauss in an inner circumferential region (a location of a radius of 21 mm) of the disk and about 1.9 k Gauss in an outer circumferential region (a location of a radius of 46.5 mm) of the disk was generated with a pulse width of 350 μsec around the coils.

At this moment, the value of the pulse width of the second external magnetic field was 35/10,000 times as much as the irradiation period of the energy beams.

As shown in FIG. 3(b), since the magnetic field by the air-core coils 28a, 28b subserves the magnetic field by the permanent magnets 22a to 22d, the maximum magnetic field of about 3.4 k Gauss in an inner circumferential region of the disk (a location of a radius of 21 mm) and about 3.8 k Gauss in an outer circumferential region of the disk (a location of a radius of 46.5 mm) was applied in total.

Figure 6:
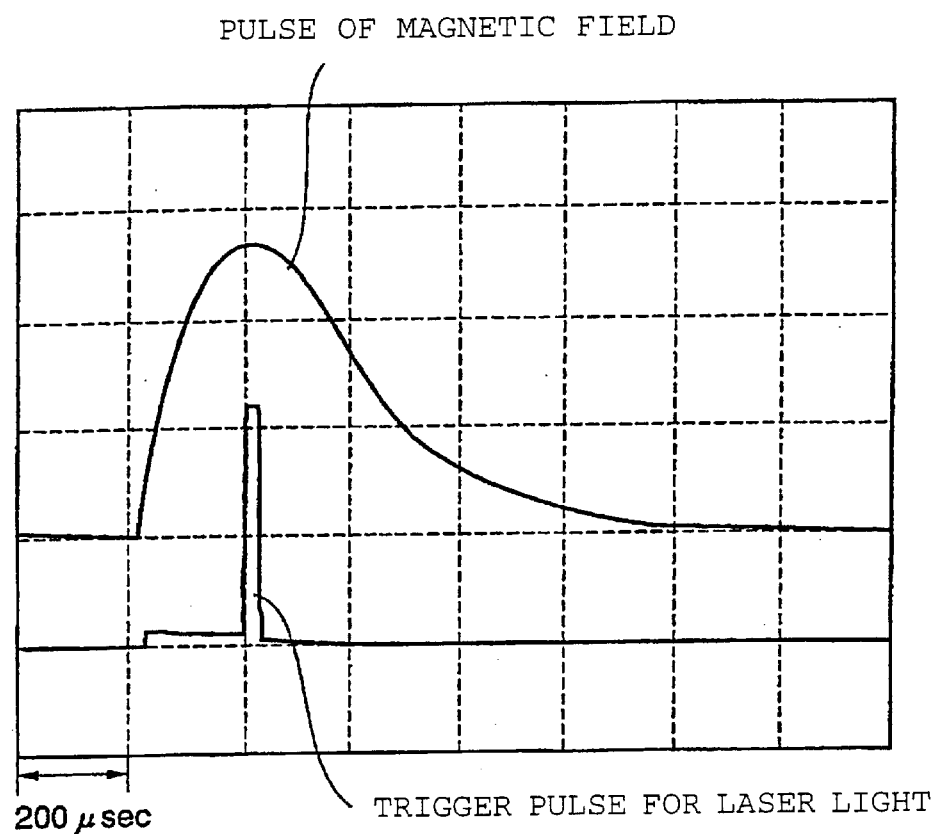
FIG. 6 is a diagram showing the relation of a magnetic field pulse to a trigger pulse for laser light in time sequence according to an embodiment of the present invention.

FIG. 6 shows a temporal relation between the pulse of magnetic field and the trigger pulse for laser in Example 1. In Example 1, excimer pulse laser was irradiated about 4 μsec after the emittance of the trigger pulse for laser. As understood from FIG. 6, timing was adjusted so that the pulse laser was irradiated when the intensity of the magnetic field became the maximum.

The structure of the optical system for laser irradiation used in this Example is as follows. The pulsed laser oscillated from an excimer pulse laser source is passed through a programmable shutter which serves to take only a predetermined number of pulses from the laser source.

Laser selected by the programmable shutter is subjected to adjustment of power to have a predetermined power. Then, the laser is passed through a prism array in which the laser is divided into three portions in a short axis direction and a prism array in which the laser is divided into seven portions in a long axis direction, and then, the laser reaches a projection lens. The prism arrays function to divide and superimpose the laser so as to equalize the intensity distribution of energy. These prism arrays are sometimes referred to as homogenizers. The laser is passed through a shading plate, if required, to have a predetermined shape of beam, and is passed through a photomask in which the intensity distribution is changed according to the magnetic pattern, to be projected onto the disk.

Comparative Example 1

A magnetic disk was prepared in the same manner as Example 1. The surface of the disk was magnetized uniformly by applying a magnetic field with a permanent magnet so that the direction of the magnetic field was the same as the direction of rotating the disk and the magnetic field had an intensity of about 10 kOe (about 10 k Gauss).

Then, the printing of a mask pattern was conducted in the same manner as Example 1 except that a magnetic field of about 2.1 k Gauss in an inner circumferential region of the disk (a location of a radius of 21 mm) and about 2.7 k Gauss in an outer circumferential region of the disk (a location of a radius of 46.5 mm), which was generated by only permanent magnets, was applied in a circumferential direction of the magnetic disk and the direction opposite to the uniform magnetization.

Evaluation

On the magnetic disks obtained in Example 1 and Comparative Example 1, magnetic patterns were reproduced with the MR head for hard disk having a width of playback element of 0.4 μm, and C/N and the modulation of reproducing signals were measured. A results is shown in Table 1.

TABLE 1

|  | C/N (db) | Modulation (%) |
|---|---|---|
| Example 1 | 20.2 | 13 |
| Comparative Example 1 | 16.5 | 55 |

Example 2

A NiP-plated aluminosilicate glass substrate having a diameter of 2.5 inches was prepared, and a magnetic disk having a diameter of 2.5 inches was prepared by forming the recording layer and so on according to the same procedure as in Example 1.

As a lubricant layer, a fluorine type lubricant was coated on the disk in a thickness of 0.5 nm and baked at 100° C. for 40 minutes to obtain a longitudinal magnetic recording disk having a static coercive force of 3,800 Oe and a saturated magnetization of 310 emu/cc at room temperature.

The disk surface was uniformly magnetized by applying a magnetic field with an intensity of about 10 kOe (about 10 k Gauss) to this disk so that the direction of magnetic field by a permanent magnetic would be the same as the direction of rotating the disk.

A doughnut-like substrate of quartz glass having an outer diameter of 95 mm, an inner diameter of 10 mm and a thickness of 2.3 mm was used for a photomask. 100 nm of silicon and 30 nm of $SiO_2$ were successively formed on the surface of the substrate facing the disk, and an area for etching (a pattern area) was etched to form a non-transmissive portion having the minimum width of pattern of 0.33 $\mu$m (0.33 $\mu$m for a line portion and a space portion). The area other than the area for etching (pattern area) is a non-transmissive portion comprising the silicon layer and the $SiO_2$ layer. The reflectivity of the thus obtained photomask to excimer pulse laser having a wavelength of 248 nm was 30% at the non-transmissive portion and 5% at the transmissive portion.

Then, a spacer of Cr layer was provided in a circumferential portion of the pattern area by a lift-off method. Namely, the mask in which substantially circular projections (spacer) having a height of 0.5 $\mu$m and a diameter of 50 $\mu$m were arranged at intervals of 100 $\mu$m in an area of 32.3 to 32.5 mm in radius in an outer circumferential portion other than the pattern area, was obtained.

The photomask was overlaid on the magnetic disk. Air between the photomask and the magnetic disk was sucked with a vacuum pressure of −40 kPa to bring the photomask into close contact with the magnetic disk, and they were rotated at a speed of 3.2 sec per revolution. Then, the printing of magnetic pattern was conducted under the following conditions. An excimer pulse laser having a wavelength of 248 nm was controlled to have a pulse width of 25 nsec, a power (energy density) of 53 mJ/cm$^2$ and a beam shape of 5 mm×30 m (a diameter corresponding to 1/e$^2$ of the peak energy); a shading plate for forming the beam shape into a sectorial shape having an angle of 6° was disposed at the laser irradiation port, and pulsed laser was irradiated with 64 pulses at a repetitive frequency of 20 Hz (irradiation period: 50 msec), and at the same time, a magnetic field was applied with the magnetic field applying means shown in FIG. 3. In obtaining the heating temperature by simulation, it was found that the temperature was from about 170° C. to 200° C.

Namely, it was found that a magnetic field of about 1.4 k Gauss in an inner circumferential region of the disk (a location of a radius of 17 mm) and about 1.4 k Gauss in an outer circumferential region of the disk (a location of a radius of 30 mm) was always applied in a circumferential direction of the magnetic disk in a direction opposite to the uniform magnetization by the presence of the permanent magnets 22a to 22d.

Further, by supplying a pulse-like current of 900 V to the air-core coils 28a, 28b, a pulse-like magnetic field of about 2.4 k Gauss in an inner circumferential region of the disk (a location of a radius of 17 mm) and about 2.5 k Gauss in an outer circumferential region of the disk (a location of a radius of 30 mm) was generated with a pulse width of 90 $\mu$sec around the coils.

At this moment, the value of the pulse width of the second external magnetic field was 9/5,000 times as much as the irradiation period of the energy beams.

As shown in FIG. 3(b), since the magnetic field by the air-core coils 28a, 28b subserves the magnetic field by the permanent magnets 22a to 22d, the maximum magnetic field of about 3.8 k Gauss in an inner circumferential region of the disk (a location of a radius of 17 mm) and about 3.9 k Gauss in an outer circumferential region of the disk (a location of a radius of 32 mm) was applied in total.

The temporal relation between the pulse of the magnetic field and the trigger pulse for laser light is the same as in Example 1, and the construction of the optical system used was the same as in Example 1.

Comparative Example 2

A magnetic disk was prepared in the same manner as Example 2.

The printing of a mask pattern was conducted in the same manner as Example 2 except that the space between the magnetic disk and the mask was kept to be 0.5 $\mu$m without sucking air between the magnetic disk and the mask, and a laser power of 63 mJ/cm$^2$ was irradiated.

Evaluation

On the magnetic disks obtained in Example 2 and Comparative Example 2, magnetic patterns were reproduced with the MR head for hard disk having a width of playback element of 0.4 $\mu$m to measure the rate of occurrence of sub-pulses. In Example 2, the rate of occurrence of sub-pulses was 12% and in Comparative Example 2, the rate of occurrence of sub-pulses was 22%. Thus, it was confirmed in Example 2 that the occurrence of sub-pulses could be suppressed.

According to the present invention, since the second external magnetic field has a pulse-like magnetic field component, a heated area can be magnetized well without affecting adversely a non-heated area around the heated area even when the pulse-like magnetic field component is larger than the static coercive force at room temperature. Further, there is little possibility that noises are generated in an area which is previously magnetized uniformly or that a magnetic pattern once formed is erased.

A fine magnetic pattern having a high output of reproducing signal, high S/N and C/N and a small modulation can effectively be formed even in a medium having a large dynamic coercive force which is usable for high density recording. Further, a magnetic recording medium and a magnetic recording device capable of high density recording can be produced economically in a short time.

What is claimed is:

1. A method for forming a magnetic pattern by applying a first external magnetic field to a magnetic recording medium having a magnetic layer to magnetize uniformly the magnetic layer in a predetermined direction and heating locally the magnetic layer while a second external magnetic field is applied thereto, whereby the heated portion is magnetized in the direction opposite to the predetermined direction, wherein the second external magnetic field has a pulse-like magnetic field component.

2. The method for forming a magnetic pattern according to claim 1, wherein the pulse width of the pulse-like magnetic field component of the second external magnetic field is 100 msec or less.

3. The method for forming a magnetic pattern according to claim 1, wherein the pulse width of the pulse-like magnetic field component of the second external magnetic field is 10 msec or less.

4. The method for forming a magnetic pattern according to claim 1, wherein the magnetic layer is heated locally by energy beams.

5. The method for forming a magnetic pattern according to claim 4, wherein the energy beams are irradiated to the magnetic layer through a mask.

6. The method for forming a magnetic pattern according to claim 5, wherein the energy beams are irradiated in a state that the mask is in contact with at least a portion of the magnetic recording medium.

7. The method for forming a magnetic pattern according to claim 4, wherein the energy beams are pulse-like energy beams.

8. The method for forming a magnetic pattern according to claim 7, wherein the pulse width of the second external field is ½ times or less as large as the irradiation period of the pulse-like energy beams.

9. The method for forming a magnetic pattern according to claim 7, wherein the pulse width of the pulse-like energy beams is 1 μsec or less.

10. The method for forming a magnetic pattern according to claim 1, wherein the magnetic recording medium is a disk-like magnetic recording medium; the direction of the first and second external magnetic fields is a circumferential or radial direction of the medium, or is perpendicular to the medium surface, and the direction of the first external magnetic field is opposite to the direction of the second external magnetic field.

11. The method for forming a magnetic pattern according to claim 1, wherein the second external magnetic field is simultaneously applied to the entire surface of the medium to form a magnetic pattern.

12. The method for forming a magnetic pattern according to claim 11, wherein the magnetic recording medium is a disk-like magnetic recording medium having a diameter of 2.5 inches or less.

13. The method for forming a magnetic pattern according to claim 1, wherein the maximum intensity of the second external magnetic field is at least ⅔ times as much as the static coercive force of the magnetic recording medium at room temperature.

14. The method for forming a magnetic pattern according to claim 1, wherein the magnetic recording medium has at least two magnetic layers.

15. The method for forming a magnetic pattern according to claim 1, wherein the second external magnetic field is applied with at least an electromagnet.

16. The method for forming a magnetic pattern according to claim 15, wherein the second external magnetic field is applied by combining the application of a static magnetic field with use of a permanent magnet or an electromagnet and the application of a pulse-like magnetic field with use of an electromagnet.

17. The method for forming a magnetic pattern according to claim 16, wherein the intensity of the magnetic field with the permanent magnet is lower than the static coercive force of the magnetic recording medium at room temperature.

18. The method for forming a magnetic pattern according to claim 16, wherein the intensity of the magnetic field with the permanent magnet is lower than a nuclear generating magnetic field Hn in a heated portion of the magnetic recording medium.

19. The method for forming a magnetic pattern according to claim 1, wherein the magnetic pattern is a controlling pattern having information for controlling a recording/reproducing magnetic head.

20. The method for forming a magnetic pattern according to claim 19, wherein the controlling pattern contains a servo pattern for controlling the position of the recording/reproducing magnetic head or a standard pattern for recording the servo pattern.

21. The method for forming a magnetic pattern according to claim 15, wherein the magnetic recording medium is a longitudinal magnetic recording medium; a conductive coil is disposed at a single side or both sides of the magnetic layer in parallel, and the second external magnetic field is formed by applying a pulse-like electric current to the conductive coil.

22. The method for forming a magnetic pattern according to claim 15, wherein the magnetic recording medium is a longitudinal magnetic recording medium; a conductive coil is disposed at a single side of the magnetic layer in parallel; a conductive plate is disposed at the reverse side in parallel, and the second external magnetic field is applied by supplying a pulse-like electric current to the conductive coil.

23. The method for forming a magnetic pattern according to claim 15, wherein the magnetic recording medium is a perpendicular magnetic recording medium; a conductive coil is disposed at both sides of the magnetic layer, and the second external magnetic field is applied by supplying a pulse-like electric current to the conductive coil.

24. The method for forming a magnetic pattern according to claim 11, wherein the magnetic recording medium is a disk-like longitudinal magnetic recording medium having the central opening; a conductive member is passed through the central opening so that the conductive member extends in the direction perpendicular to the medium, and the second external magnetic field is applied in a circumferential direction of the medium by supplying an electric current to the conductive member.

25. The method for forming a magnetic pattern according to claim 1, wherein the heating temperature for the heated portion of the magnetic layer is at most Curie temperature of the magnetic layer.

26. The method for forming a magnetic pattern according to claim 1, wherein the magnetic recording medium has a lubricant layer on the magnetic layer, and the heating temperature to a heated portion of the magnetic layer is not more than the thermal decomposition temperature of the lubricant layer.

27. The method for forming a magnetic pattern according to claim 1, wherein the maximum intensity of the second external magnetic field satisfies the below-mentioned (1) and (2):

(1) The magnetic layer, when applied with the second external magnetic field, maintains a magnetic force in a predetermined direction in a room temperature range, and the magnitude of magnetization is at least 0.70 times as much as the saturated magnetization, and (2) The heated portion of the magnetic layer, when applied with the second external magnetic field, is magnetized in the reverse direction with respect to the predetermined direction, and the magnitude of magnetization is at least 0.70 times as much as the saturated magnetization.

28. A magnetic recording medium in which a magnetic pattern is formed by the method for forming a magnetic pattern according to claim 1.

29. A magnetic recording device characterized by comprising a magnetic recording medium in which a magnetic pattern is formed by the method for forming a magnetic pattern according to claim 1, a driving portion for driving the magnetic recording medium in a recording direction, a magnetic head having a recording portion and a reproducing portion, means for moving relatively the magnetic head with respect to the magnetic recording medium, and a recording/reproducing signal processing means which supplies a recording signal to the magnetic head and receives a reproducing signal from the magnetic head.

30. The magnetic recording device according to claim 29, wherein after the magnetic recording medium has been assembled in the magnetic recording device, the magnetic head reproduces a magnetic pattern to produce signals, and final servo burst signals produced based on the signals are recorded by means of the magnetic head.

31. A method for producing a magnetic recording medium having a magnetic layer, a protective layer and a lubricant layer formed on a substrate in this order wherein a magnetic pattern is formed in the magnetic layer, the method being characterized by comprising a step of forming the magnetic layer and the protective layer on the substrate, a step of forming the lubricant layer on the protective layer, and a step of applying a first external magnetic field to magnetize uniformly the magnetic layer in a predetermined direction, and heating locally the magnetic layer while applying a second external magnetic field having a pulse-like magnetic field component to magnetize the heated portion in the direction opposite to the predetermined direction whereby a magnetic pattern is formed.

32. The method for producing a magnetic recording medium according to claim 31, wherein the magnetic pattern is a controlling pattern having information for controlling a recording/reproducing magnetic head.

33. A magnetic recording medium characterized by being produced by the method described in claim 31.

34. A magnetic recording device characterized by comprising a magnetic recording medium produced by the method described in claim 31, a driving portion for driving the magnetic recording medium in a recording direction, a magnetic head having a recording portion and a reproducing portion, means for moving relatively the magnetic head with respect to the magnetic recording medium, and a recording/reproducing signal processing means which supplies a recording signal to the magnetic head and receives a reproducing signal from the magnetic head.

35. The magnetic recording device according to claim 34, wherein after the magnetic recording medium has been assembled in the magnetic recording device, the magnetic head reproduces a magnetic pattern to produce signals, and final servo burst signals produced based on the signals are recorded by means of the magnetic head.

36. A magnetic pattern forming device for forming a magnetic pattern in a magnetic recording medium, the magnetic pattern forming device being characterized by comprising a medium holding means for holding the magnetic recording medium, an energy beam source for emitting energy beams, a projection means for projecting and irradiating the energy beams from the energy beam source to the magnetic recording medium, and a magnetic field generating means for applying a magnetic field to the magnetic recording medium, wherein the magnetic field generating means generates a magnetic field having a pulse-like magnetic field component.

37. The magnetic pattern forming device according to claim 36, wherein a mask is disposed between the energy beam source and the magnetic recording medium so as to change the intensity distribution of the energy beams depending on a pattern to be formed.

38. The magnetic pattern forming device according to claim 36, wherein the magnetic field generating means has an electromagnet.

39. The magnetic pattern forming device according to claim 38, wherein the magnetic field generating means includes a permanent magnet and an electromagnet in combination.

* * * * *